(12) United States Patent
Goodwin et al.

(10) Patent No.: US 8,977,721 B2
(45) Date of Patent: Mar. 10, 2015

(54) METHOD AND APPARATUS FOR DYNAMIC PRIORITIZATION OF CONTENT LISTINGS

(75) Inventors: Mark Goodwin, Mountain View, CA (US); Thomas C. Marksworth, San Carlos, CA (US); David A. Westerhoff, Fremont, CA (US)

(73) Assignee: Roku, Inc., Saratoga, CA (US)

( * ) Notice: Subject to any disclaimer, the term of this patent is extended or adjusted under 35 U.S.C. 154(b) by 179 days.

(21) Appl. No.: 13/431,910

(22) Filed: Mar. 27, 2012

(65) Prior Publication Data

US 2013/0262633 A1    Oct. 3, 2013

(51) Int. Cl.
| | |
|---|---|
| *G06F 15/16* | (2006.01) |
| *H04N 21/4722* | (2011.01) |
| *H04N 21/482* | (2011.01) |
| *H04N 21/472* | (2011.01) |
| *H04N 21/84* | (2011.01) |
| *H04N 21/475* | (2011.01) |
| *H04N 21/4725* | (2011.01) |
| *H04N 21/8405* | (2011.01) |

(52) U.S. Cl.
CPC ....... *H04N 21/4722* (2013.01); *H04N 21/4821* (2013.01); *H04N 21/47202* (2013.01); *H04N 21/8402* (2013.01); *H04N 21/47208* (2013.01); *H04N 21/482* (2013.01); *H04N 21/84* (2013.01); *H04N 21/4755* (2013.01); *H04N 21/472* (2013.01); *H04N 21/4826* (2013.01); *H04N 21/4756* (2013.01); *H04N 21/4725* (2013.01); *H04N 21/8405* (2013.01)
USPC ........................................................ 709/219

(58) Field of Classification Search
CPC ... H04N 21/482; H04N 21/472; H04N 21/84; H04N 21/8402; H04N 21/8405; H04N 21/47202; H04N 21/47208; H04N 21/4722; H04N 21/4725; H04N 21/4755; H04N 21/4756; H04N 21/4821; H04N 21/4826
USPC ........................................................ 709/219
See application file for complete search history.

(56) References Cited

U.S. PATENT DOCUMENTS

| | | | |
|---|---|---|---|
| 4,363,489 | A | 12/1982 | Chodak et al. |
| 5,801,747 | A * | 9/1998 | Bedard ............ 725/46 |
| 5,933,811 | A | 8/1999 | Angles et al. |
| 6,567,984 | B1 | 5/2003 | Allport |
| 7,305,406 | B2 | 12/2007 | Liu et al. |
| 7,627,888 | B2 * | 12/2009 | Ganesan et al. ........ 725/92 |
| 7,742,740 | B2 | 6/2010 | Goldberg et al. |

(Continued)

OTHER PUBLICATIONS

Anonymous, "TWAIN—Linking Applications and Images," Computer Technology REview, vol. 13, No. 6, pp. 8-9, May 1993.

(Continued)

*Primary Examiner* — Ario Etienne
*Assistant Examiner* — Blake Rubin
(74) *Attorney, Agent, or Firm* — Cooley LLP

(57) ABSTRACT

A method for presenting content to a client device through a platform server includes detecting a selection of current content at the platform server. An attribute of the current content is identified. Additional content based on the attribute is identified. A representation of the additional content configured to be displayed at the client device is transmitted. A selection of the additional content is detected at the platform server. The attribute is revised based on the selection of the additional content. A representation of revised content configured to be displayed at the client device is transmitted. The revised content is based on revising the attribute.

9 Claims, 22 Drawing Sheets

(56) References Cited

U.S. PATENT DOCUMENTS

| | | | |
|---|---|---|---|
| 7,778,980 B2 | 8/2010 | Bodin et al. | |
| 7,802,286 B2 | 9/2010 | Brooks et al. | |
| 7,840,986 B2 * | 11/2010 | Ali et al. | 725/105 |
| 7,849,135 B2 | 12/2010 | Agrawal et al. | |
| 7,895,624 B1 * | 2/2011 | Thomas et al. | 725/44 |
| 7,929,029 B2 | 4/2011 | Morimoto et al. | |
| 7,984,468 B2 * | 7/2011 | Westberg | 725/46 |
| 8,005,913 B1 | 8/2011 | Carlander | |
| 8,094,891 B2 | 1/2012 | Andreasson | |
| 8,159,959 B2 * | 4/2012 | Ohlfs et al. | 370/252 |
| 8,171,112 B2 | 5/2012 | Shum et al. | |
| 8,265,612 B2 | 9/2012 | Athsani et al. | |
| 8,615,776 B2 * | 12/2013 | Hill et al. | 725/43 |
| 8,640,166 B1 * | 1/2014 | Craner | 725/38 |
| 2001/0037240 A1 | 11/2001 | Marks et al. | |
| 2001/0054059 A1 | 12/2001 | Marks et al. | |
| 2002/0007368 A1 * | 1/2002 | Lee et al. | 707/500.1 |
| 2002/0042923 A1 | 4/2002 | Asmussen et al. | |
| 2002/0078449 A1 * | 6/2002 | Gordon et al. | 725/41 |
| 2002/0107973 A1 | 8/2002 | Lennon et al. | |
| 2002/0135608 A1 | 9/2002 | Hamada et al. | |
| 2002/0174430 A1 * | 11/2002 | Ellis et al. | 725/46 |
| 2002/0184650 A1 | 12/2002 | Stone | |
| 2003/0018748 A1 * | 1/2003 | McKenna, Jr. | 709/219 |
| 2003/0093790 A1 | 5/2003 | Logan et al. | |
| 2003/0110503 A1 * | 6/2003 | Perkes | 725/86 |
| 2003/0131355 A1 * | 7/2003 | Berenson et al. | 725/46 |
| 2003/0132953 A1 | 7/2003 | Johnson et al. | |
| 2003/0193518 A1 | 10/2003 | Newnam et al. | |
| 2003/0208763 A1 | 11/2003 | McElhatten et al. | |
| 2004/0070593 A1 * | 4/2004 | Neely et al. | 345/716 |
| 2004/0078383 A1 | 4/2004 | Mercer et al. | |
| 2004/0098744 A1 * | 5/2004 | Gutta | 725/46 |
| 2004/0117831 A1 | 6/2004 | Ellis et al. | |
| 2004/0170386 A1 | 9/2004 | Mikawa | |
| 2004/0194131 A1 * | 9/2004 | Ellis et al. | 725/34 |
| 2005/0160461 A1 | 7/2005 | Baumgartner et al. | |
| 2005/0177624 A1 | 8/2005 | Oswald et al. | |
| 2005/0204387 A1 * | 9/2005 | Knudson et al. | 725/52 |
| 2005/0273499 A1 | 12/2005 | Goodman et al. | |
| 2006/0064716 A1 * | 3/2006 | Sull et al. | 725/37 |
| 2006/0159109 A1 | 7/2006 | Lamkin et al. | |
| 2006/0173985 A1 | 8/2006 | Moore | |
| 2006/0248013 A1 | 11/2006 | Ebert et al. | |
| 2006/0265427 A1 * | 11/2006 | Cohen et al. | 707/200 |
| 2006/0282855 A1 | 12/2006 | Margulis | |
| 2007/0033166 A1 | 2/2007 | Trowbridge et al. | |
| 2007/0038931 A1 | 2/2007 | Allaire et al. | |
| 2007/0089143 A1 | 4/2007 | LeFevre et al. | |
| 2007/0124779 A1 | 5/2007 | Casey et al. | |
| 2007/0129109 A1 | 6/2007 | Silverbrook et al. | |
| 2007/0156589 A1 * | 7/2007 | Zimler et al. | 705/51 |
| 2007/0204311 A1 | 8/2007 | Hasek et al. | |
| 2007/0220554 A1 * | 9/2007 | Barton et al. | 725/46 |
| 2007/0220583 A1 | 9/2007 | Bailey et al. | |
| 2007/0300252 A1 * | 12/2007 | Acharya et al. | 725/25 |
| 2008/0046928 A1 * | 2/2008 | Poling et al. | 725/40 |
| 2008/0098450 A1 | 4/2008 | Wu et al. | |
| 2008/0133311 A1 | 6/2008 | Ottolina | |
| 2008/0151888 A1 | 6/2008 | Ahmed | |
| 2008/0155057 A1 | 6/2008 | Khedouri et al. | |
| 2008/0163318 A1 | 7/2008 | Chen et al. | |
| 2009/0037954 A1 * | 2/2009 | Nagano | 725/39 |
| 2009/0077589 A1 * | 3/2009 | Boyer et al. | 725/46 |
| 2009/0082095 A1 | 3/2009 | Walker et al. | |
| 2009/0094520 A1 | 4/2009 | Kulas | |
| 2009/0100147 A1 | 4/2009 | Igarashi | |
| 2009/0133090 A1 | 5/2009 | Busse | |
| 2009/0142036 A1 | 6/2009 | Branam et al. | |
| 2009/0154899 A1 * | 6/2009 | Barrett et al. | 386/124 |
| 2009/0156181 A1 | 6/2009 | Athsani et al. | |
| 2009/0157480 A1 * | 6/2009 | Smith | 705/10 |
| 2009/0165043 A1 | 6/2009 | Ou et al. | |
| 2009/0165054 A1 * | 6/2009 | Rudolph | 725/46 |
| 2009/0282021 A1 | 11/2009 | Bennett | |
| 2010/0057924 A1 | 3/2010 | Rauber et al. | |
| 2010/0070057 A1 | 3/2010 | Sugiyama | |
| 2010/0113148 A1 | 5/2010 | Haltovsky et al. | |
| 2010/0248839 A1 | 9/2010 | Davis et al. | |
| 2010/0251304 A1 * | 9/2010 | Donoghue et al. | 725/46 |
| 2010/0304727 A1 | 12/2010 | Agrawal et al. | |
| 2010/0333142 A1 * | 12/2010 | Busse et al. | 725/47 |
| 2011/0126249 A1 * | 5/2011 | Makhlouf | 725/109 |
| 2011/0179453 A1 * | 7/2011 | Poniatowski | 725/58 |
| 2011/0214147 A1 * | 9/2011 | Kashyap et al. | 725/46 |
| 2011/0225417 A1 | 9/2011 | Maharajh et al. | |
| 2011/0252100 A1 | 10/2011 | Raciborski et al. | |
| 2011/0276396 A1 | 11/2011 | Rathod | |
| 2011/0307927 A1 * | 12/2011 | Nakano et al. | 725/61 |
| 2011/0321072 A1 | 12/2011 | Patterson et al. | |
| 2011/0321093 A1 * | 12/2011 | McRae | 725/40 |
| 2012/0078953 A1 * | 3/2012 | Araya | 707/769 |
| 2012/0079529 A1 | 3/2012 | Harris et al. | |
| 2012/0110623 A1 * | 5/2012 | Hill et al. | 725/53 |
| 2012/0131627 A1 | 5/2012 | Chittella | |
| 2012/0159549 A1 * | 6/2012 | Douillet et al. | 725/42 |
| 2012/0173383 A1 * | 7/2012 | Badawiyeh et al. | 705/26.7 |
| 2012/0204201 A1 * | 8/2012 | Cassidy et al. | 725/10 |
| 2012/0210358 A1 * | 8/2012 | Anthru et al. | 725/40 |
| 2012/0221645 A1 * | 8/2012 | Anthru et al. | 709/204 |
| 2012/0226536 A1 | 9/2012 | Kidron | |
| 2012/0297423 A1 | 11/2012 | Kanojia et al. | |
| 2012/0304223 A1 * | 11/2012 | Sargent et al. | 725/32 |
| 2012/0311623 A1 * | 12/2012 | Davis et al. | 725/18 |
| 2013/0110978 A1 * | 5/2013 | Gordon et al. | 709/218 |

OTHER PUBLICATIONS

Anonymous, "Ninja and Pringo Partner to Boost Adoption of Mobile Social Networking," Marketwire, May 13, 2008.

Anonymous, "Update: Memeo® Enhances Photo Sharing Offering with PC, Mac and iPhone™ Products," Marketwire, Sep. 16, 2008.

Cesar, "Social Television and User Interaction", ACM Computers in Entertainment, vol. 6, No. 1, May 2008, 10 pgs.

The Play Team, "MiTV: Rethinking Interactive TV", Proceedings of the Seventh International Conference on Virtual Systems and Multimedia (VSMM), IEEE, 2001, 5 pgs.

International Search Report and Written Opinion issued to international patent application No. PCT/US13/33928, Apr. 15, 2013, 11 pgs.

International Search Report and Written Opinion issued to international patent application No. PCT/US13/33929, Apr. 19, 2013, 11 pgs.

* cited by examiner

CONTENT RESULTS — 552

| Status | | Provider | Details — 559 |
|---|---|---|---|
| Subscribed | Available Now — 555 | AAAA — 557 | Free (included) |
| | | BBBB — 558 | Addition $ $ $ |
| Subscribed | Available Soon — 556 | CCCC — 561 | 1 week — 562    Alert? ☐ |
| | | DDDD — 564 | # 2 on wait list    Alert? ☐ |
| Suggestions | Available Now — 567 | XXXX — 568 | $ $ $ Download |
| | | YYYY — 569 | $ $ $ Subscription |

METHOD AND APPARATUS FOR DYNAMIC PRIORITIZATION OF CONTENT LISTINGS

CROSS-REFERENCES TO RELATED INVENTIONS

This application is related to the following concurrently filed and commonly owned patent applications:
Method and Apparatus for Identifying and Recommending Content, Ser. No. 13/431,866, filed Mar. 27, 2012;
Method and Apparatus for Recurring Content Searches and Viewing Window Notification, Ser. No. 13/431,886, filed Mar. 27, 2012;
Method and Apparatus for Dynamic Prioritization of Content Through Interactive Browsing, Ser. No. 13/431,901, filed Mar. 27, 2012;
Method and Apparatus for Tagging and Searching Content, Ser. No. 13/431,918, filed Mar. 27, 2012;
Method and Apparatus for Displaying Information on a Secondary Screen, Ser. No. 13/431,923, filed Mar. 27, 2012;
Method and Apparatus for Handling Content Requests and Playlist Information, Ser. No. 13/431,928, filed Mar. 27, 2012;
Method and Apparatus for Sharing Content, Ser. No. 13/431,932, filed Mar. 27, 2012;
Method and Apparatus for Channel Prioritization, Ser. No. 13/431,937, filed Mar. 27, 2012.

FIELD OF THE INVENTION

The invention generally relates to managing content, and more particularly relates to searching for content in a streaming media environment.

BACKGROUND

Consumers have an increasing amount of on-demand media content available to them. For example, on-demand media content includes visual content (e.g., movies, television shows, still images), audio content (e.g., music), and software applications (e.g., games).

Along with an increasing amount of on-demand content available, it becomes more challenging for the consumer to find and select their content of interest. Some consumers find their content through browsing through movies through genre categories while others find their content through searches for titles, directors, or actors.

Consumers also have an increasing number of choices on where to buy, rent, or consume this content without cost. With the increase of available content and content provider choices, it becomes more challenging for the consumer to find the right content from the right content provider. For example, some content is available free for paid subscribed users; other content is available without charge and without a subscription; and yet other content is available for rent or purchase on an individual basis.

SUMMARY

A method for presenting content to a client device through a platform server includes detecting a selection of current content at the platform server. An attribute of the current content is identified. Additional content based on the attribute is identified. A representation of the additional content configured to be displayed at the client device is transmitted. A selection of the additional content is detected at the platform server. The attribute is revised based on the selection of the additional content. A representation of revised content configured to be displayed at the client device is transmitted. The revised content is based on revising the attribute.

A system includes a client device configured to transmit input based on a display of content and a platform server coupled to the client device. The platform server is configured to receive the input from the client device and to revise a selection of content for the client device based on an attribute of the input.

BRIEF DESCRIPTION OF THE DRAWINGS

The following figures depict various embodiments for illustrative purposes. From the figures and corresponding description, different embodiments may be employed without departing from the invention as described herein.

DETAILED DESCRIPTION

Figure 1:
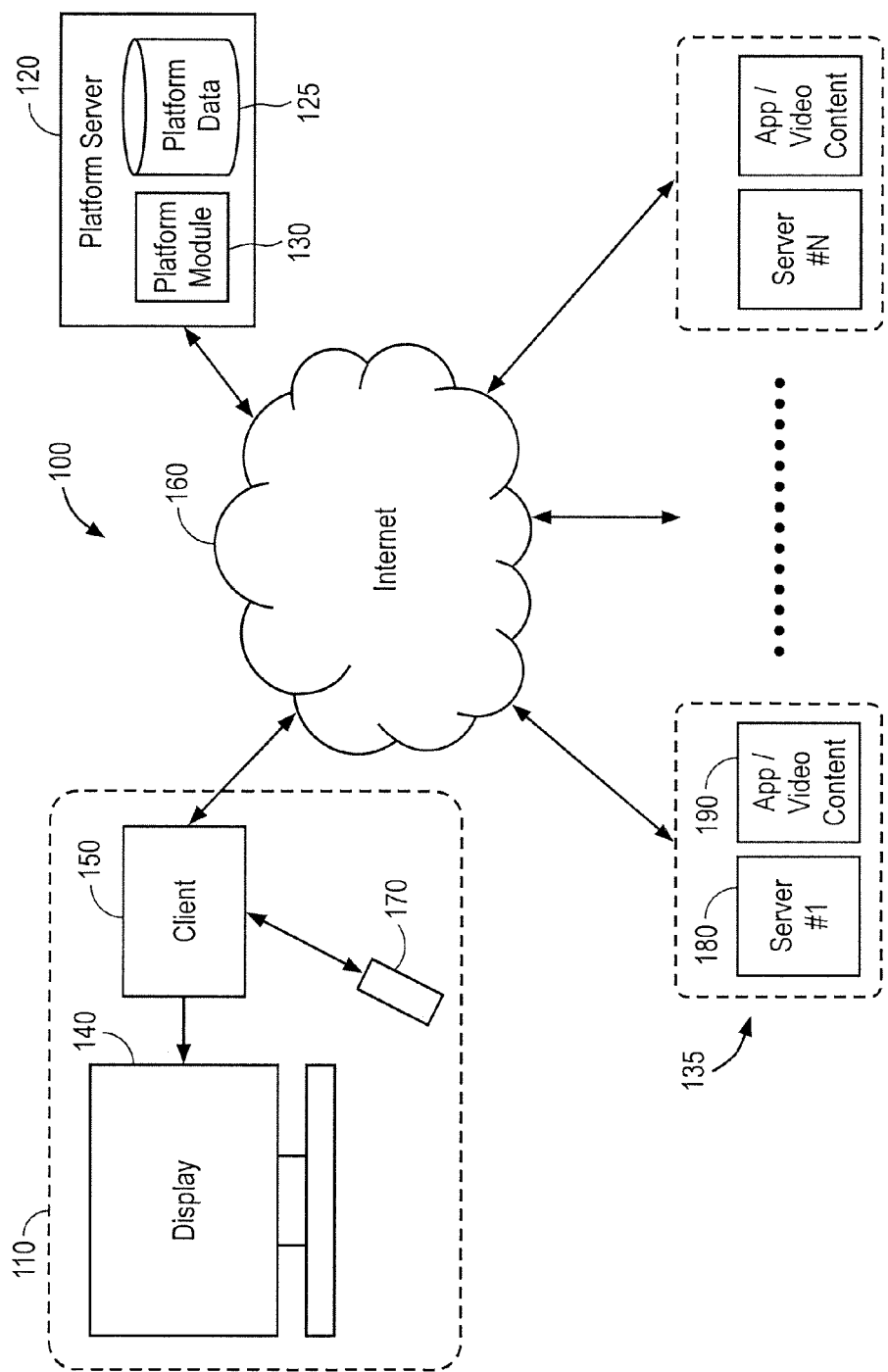
FIGS. 1-4 illustrate block diagrams showing an exemplary system according to one embodiment of the invention.

FIG. 1 illustrates a block diagram according to one embodiment of a streaming environment 100. In particular, the streaming environment 100 includes an interface system 110, a platform server 120, and one or more sources of content programming 135. In one embodiment, the interface system 110 includes a display device 140 (e.g. monitor and television), a client device 150 (e.g. streaming player), and a user input device 170. The client device 150 is configured to communicate with the display device 140 and a network 160.

In one embodiment, the platform server 120 includes a database 125 and a platform module 130. The database 125 is configured to store data such as programming software packages. The data within these programming software packages include: the network locations and content descriptions of content sources 135, hardware/software capabilities of different firmware versions and specifications of the client device 150, customer data associated with each client device 150, and user interface information associated with the client device 150.

In one embodiment, the customer data includes customer specific information such as demographic data, geographic data, ISP identification, and financial information. In one embodiment, the platform server 120 generates customized user interfaces for each of the client devices 150. In one embodiment, the user interface from the platform server 120 provides a selection of content such as audio, visual, and gaming content to the client device 150. In this example, the platform server 120 is configured to supply a graphical representation of the selection content to the client device 150 and further allows the client device 150 to select and access individual content from the selected content from the content source 135 through this graphical representation of the selection content.

In one embodiment, the platform server 120 is configured to receive input from client device 150 and processes the input through the platform module 130. The input from the client device 150 includes navigation and selection commands which may represent selection of content, search for content, and ongoing interaction with an application running on the platform server 120.

In one embodiment, the client device 150 displays content on display device 140. In one embodiment, the content displayed on the display device is sourced from one of the client device 150, the platform server 120, and the content source 135. In one embodiment, the input device 170 transmits signals to the client device 150. In one embodiment, the input device 170 utilizes one of or a combination of: an infrared signal, radio frequency signal, and Bluetooth signal to communicate with the client device 150.

The input device 170 is configured to enter data and to make user selections from the interface as presented through the client device 150. In one embodiment, the interface displayed by the client device 150 may be from the platform server 120, from the content sources 135, or be locally generated by the client device 150. In one embodiment, the input device 170 also includes a display to show additional content. In another embodiment, the input device 170 includes a touch screen which allows content to be displayed and input to be received. Exemplary input devices 170 include remote controls, smart phones, tablets, and mobile computers.

In one embodiment, the content sources 135 include a server 180 and a storage device with content 190. In one embodiment, the network address of particular content stored within the storage device 190 is maintained within the platform server 120. In another embodiment, the general location of the content source 135 is maintained and stored within the platform server 120 while the specific locations of corresponding content are managed locally by the content source 135. In yet another embodiment, the location of the content source 135 is embedded within the graphical representation displayed through the client device 150 such that interaction with the graphical representation through the client device 150 allows the content located within the content source 135 to be accessible to the client device 150.

In one embodiment, the content stored within the storage device 190 includes music, video, still pictures, text, graphics, gaming applications, and the like. In one embodiment, the particular content which is stored within the storage device 190 is provided to the client device 150 through the network 160. In one embodiment, the network 160 is the Internet. In another embodiment, the network 160 is a local area network.

In one embodiment, the client device 150 makes a request for specific content. If the requested content is video content, the storage device 190 transmits video data that represents the specific video content to the client device 150 through the content source 135.

In one embodiment, platform server 120 supports interfaces, such as login interfaces, search interfaces, and customized interfaces for the client device 150.

Figure 2:
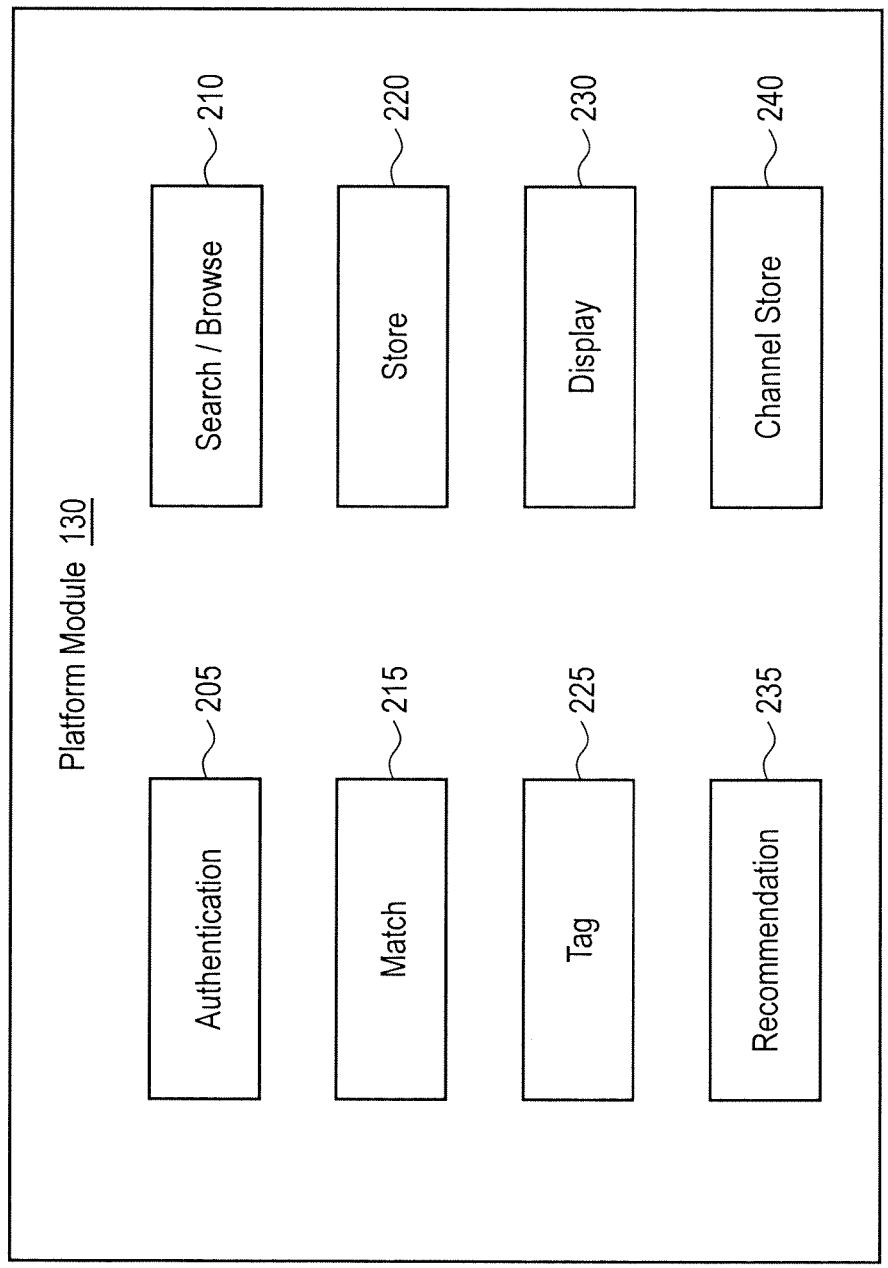

FIG. 2 illustrates a representative platform module 130 as shown in FIG. 1. In one embodiment, the platform module 130 includes an authentication module 205, a search/browse module 210, a match module 215, a store module 220, a tag module 225, a display module 230, a recommendation module 235, and a channel store module 240.

The authentication module 205 interacts with the client device 150 and authenticates a profile or user account associated with the particular client device 150. For example, the profile includes data associated with a user such as the user name, password, device associations, IP addresses, location, email address, payment information, and content subscriptions. In one embodiment, the authentication module 205 recognizes and authenticates the client device associated with a particular user account through password authentication, location authentication, visual authentication, or audio authentication. The authentication can be configured to occur when setting up a new client device 150, purchasing content or subscriptions, or periodically as needed.

The search/browse module 210 is configured to detect input from a client device 150 and/or the input device 170. In one embodiment, the input represents the selection of a channel, content, or application. In another embodiment, the input represents a textual, visual, or audible search for content, a channel, or application. In yet another embodiment, the input represents browsing content, channels, or applications.

The match module 215 coordinates searches and requests for content, channels, and applications. For example, the match module 215 identifies relevant content, channels, and applications based upon the search criteria. In one embodiment, the match module 215 relies on titles, tags, description and reviews associated with the content, channels and applications to determine relevance of the match.

The store module 220 coordinates the storage of data within the platform server 120. The data coordinated by the store module 220 includes content listings and corresponding descriptions, user profiles, searching and browsing requests, content viewed, channels and applications utilized, and tags, and friends. Depending on the nature of the data, access to the content is controlled to prevent unauthorized use.

The tag module 225 coordinates the creation and use of tags associated with content, channels, and applications. Tags can be assigned to channels and applications by the author of the channels and applications or by users through the client device 150. Tags can also be assigned to portions of audio and video streams by the author of the audio and video streams or by users through the client device 150. The tags may describe the corresponding content or allow an opportunity for a user to provide commentary associated with the corresponding content. The tags can be used for personal use and be searched by the user creating the tags or the tags can be aggregated among multiple users and searched through a public database by others.

The display module 230 coordinates display of representative content and user interfaces from the platform server 120 to each of the client devices 150. Examples of representative content include listings and descriptions of channels, content, and applications. Further, the user interface is configured to allow searching and browsing for channels, contents, and applications.

The recommendation module 235 is configured to process content recommendations based on a combination of current subscriptions, browsing or searching input, and content source. Further, the recommendation module 235 also can utilize tags to provide recommendations. In another embodiment, the recommendation module 235 utilizes the availability of the content to provide a recommendation. For example, a viewing window which describes when the content is available for viewing describes a beginning and end date for the availability of the content. Further, the recommendation module 235 can utilize the subscription data associated with each user account to determine whether the content is available to the user without additional charge because the account user is already subscribed to the content provider. Further, the recommendation module 235 can prioritize content that is available free of charge without any subscriptions. In another embodiment, the recommendation module 235 can prioritize content based on popularity ratings as illustrated under the public viewing data 335.

The channel store module 240 is configured to manage subscriptions of channels associated with each client device 150. Channels often contain content such as video content and audio content. In one embodiment, access to the content within a channel requires a subscription to that channel and the subscription is free. In another embodiment, access to the content within a channel requires a paid subscription. In yet another embodiment, access to some content and applications require payment and a subscription. In one embodiment, the channel store module 240 manages the addition of channels, content, and applications. Similarly, the channel store module 240 also manages deletion or modifications to channels, content, and application.

Figure 3:
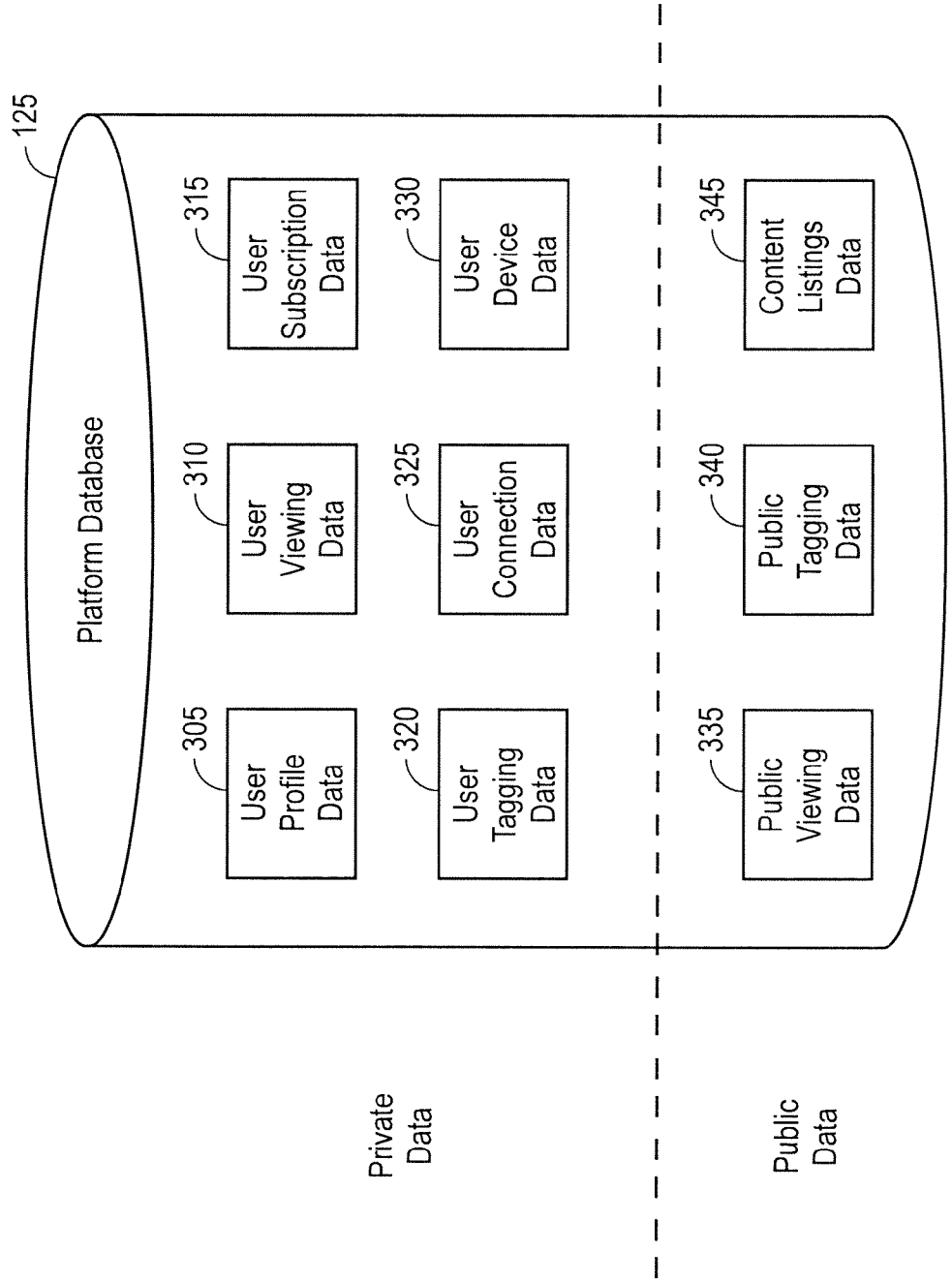

FIG. 3 illustrates a representative platform database 125 as shown in FIG. 1. In one embodiment, the platform database 125 includes private data and public data. The private data contains information which is identifiable with a particular user; the public data contains information that is aggregated and not identifiable with a particular user. The private data within the platform database 125 includes user profile data 305, user viewing data 310, user subscription data 315, user tagging data 320, user connection data 325, and user device data 330. The public data within the platform database 125 includes public viewing data 335, public tagging data 340, and content listing data 345.

In one embodiment, utilization of the private data is restricted to access within the platform server 120 and access by the particular user corresponding to the private data. Utilization of the public data can be accessed by all users and selected third parties.

The user profile data 305 includes information such as a user's name, address, credit card/payment information, age, and gender. The user viewing data 310 includes the channels, audio content, visual content, video content, and applications utilized through a client device 150. In one embodiment, the user viewing data 310 allows a client device 150 that is associated with the particular user to view recently watched channels and content as well as determine which applications were recently used. Further, the user viewing data 310 also includes stored searches that are performed through devices associated with this user account. In one embodiment, the stored searches are initiated by explicitly searching for content through a text based, image based, or voice based search. In another embodiment, the stored searches are implicitly identified by recording browsing choices. One such browsing choice is shown and described by FIGS. 5A and 5B.

The user subscription data 315 includes information such as channels subscribed by a particular user and content and applications purchased by the particular user. The user tagging data 320 includes tagging information related to a particular user. For example, the tagging information can include a user's comment or description of a channel, application or content. In one embodiment, the entire content is tagged with a description as determined by the particular user. In another embodiment, a portion of the content is tagged with a description of that portion of the content by the particular user. The user connection data 325 includes a listing of other users that are associated with the particular user as a friend. In one embodiment, having users connected to each other as friends allows a particular user to share recently watched content, channel subscriptions, user tags, and applications with other connected users. The user device data 330 includes a listing of devices associated with the particular user. The device includes a client device 150, an input device 170, a mobile device such as a tablet, laptop computer, or smart phone.

The public viewing data 335 includes a listing of channels, content, and applications utilized by many users. In one embodiment, the popularity of the content is ranked based on the number of viewers and the order in which the content is viewed. For example, the higher number of views per day for content would indicate higher popularity. Further, when multiple content entities are presented next to each other, the content entity which is selected first for viewing is given a higher popularity rating.

The public tagging data 340 includes tags that are utilized to describe channels, content, and applications from many users. In one embodiment, the tagging data within the public tagging data 340 comes from content providers. For example, a movie studio responsible for producing a movie could provide tagging data to the public tagging data 340 that describes portions of the movie. The public tagging data also includes closed captioning and subtitles associated with respective segments of the content.

The content listings data 345 includes listings of content and descriptions of the corresponding content. In one embodiment, the descriptions include key word tagging throughout the content, a summary description of the content, directors and actors associated with the content, and third party reviews associated with the content.

Figure 4:
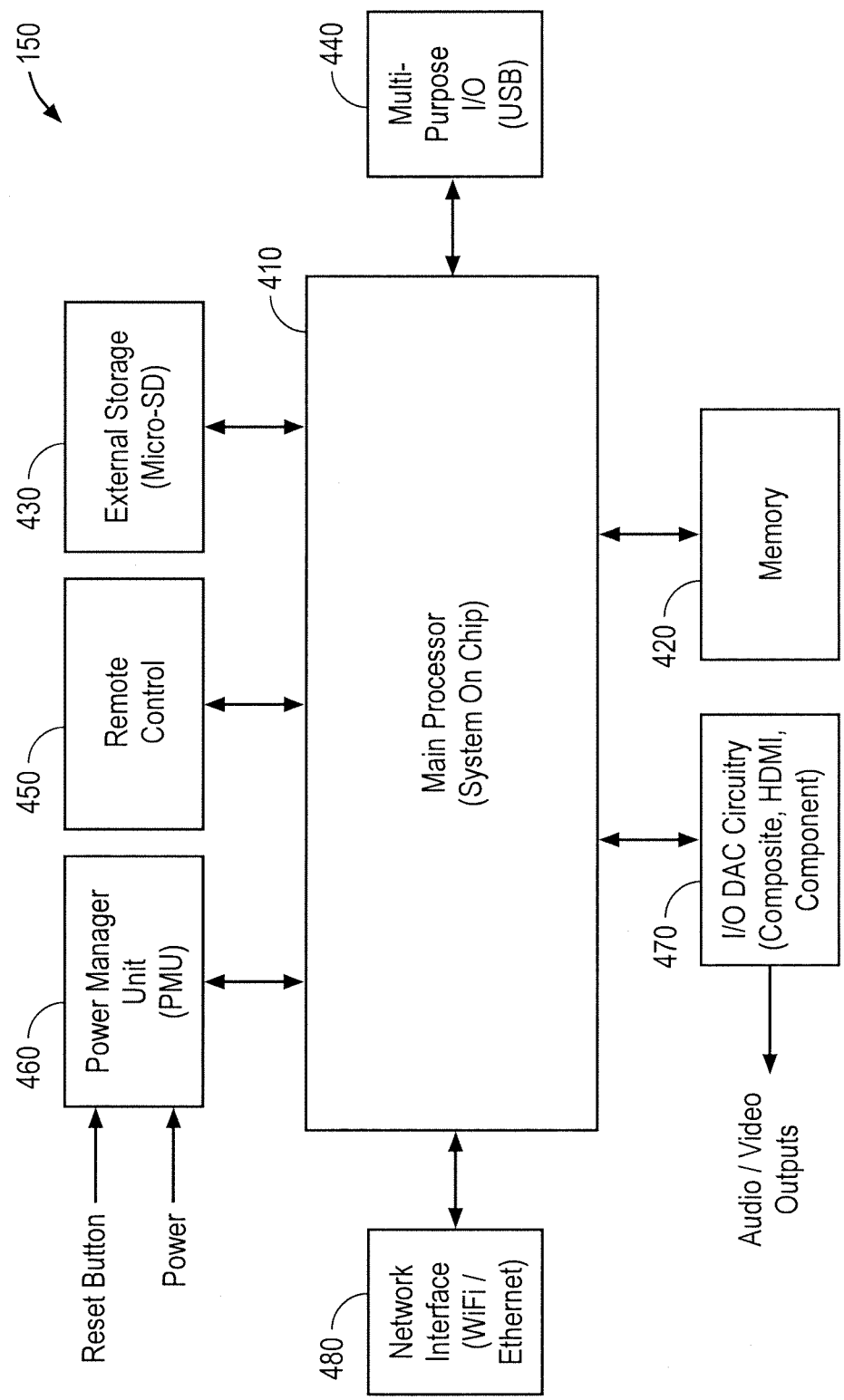

FIG. 4 illustrates a block diagram of a representative client device 150 as shown in FIG. 1. In one embodiment, the client device 150 is configured to stream content into the device. The content streamed into the client device 150 includes audio content, visual content, and applications. In one embodiment, the client device 150 is utilized to transmit instructions and selection to the content server 135 and/or the platform server 120.

In one embodiment, the client device includes a processor 410, internal memory 420, external storage 430, multipurpose I/O port 440, input device interface 450, power management 460, audio/visual I/O interface 470, and network interface 480.

In one embodiment, the processor 410 utilizes a central processing unit (CPU). In another embodiment, the processor 410 also utilizes a graphics processing unit (GPU) which may be integrated with the CPU or be configured to be physically separate. In one embodiment, the internal memory 420 includes one of or a combination of random access memory (RAM), flash memory, and read only memory (ROM). Additional memory and memory interfaces such as the multipurpose I/O port 440 may be provided in various embodiments, to support memories such as the external storage 430 which can include hard disks, Universal Serial Bus (USB) drives, Secure Digital (SD) cards, and the like. These memories may also be used for storage of applications, programs, buffered media, media, executable computer code, and software keys.

In one embodiment, the input device interface 450 enables an input device to interface with the client device 150. In one embodiment, the input device interface 450 is configured to communicate with the input device through a wireless interface such as Bluetooth (BT), radio frequency (RF), and infrared (IR). In one embodiment, the input device interface 450 supports the functionality through an input device including any combination of virtual buttons embodied on a customization screen, physical buttons, accelerometer, gyroscope, pressure sensor, tilt sensor, magnetic sensor, microphone, and light sensor.

In one embodiment, the I/O interface 470 supports multiple video output options such as High Definition Multimedia Interface (HDMI), Red-Green-Blue (RGB) component video, Separate Video (S-video), Digital Visual Interface (DVI), Video Graphics Array (VGA), Mobile High-Definition Link (MHL), and composite video. In one embodiment, USB and Apple® Thunderbolt® enabled displays are also supported.

In one embodiment, the network interface 480 supports multiple network interfaces such as Ethernet, Wi-Fi, and Bluetooth. In another embodiment, the network interface 480 also supports coaxial, digital TV antenna, and satellite television.

FIGS. 5A, 5B, 5C, 5D, 6, 7A, and 7B, illustrate screen shots showing exemplary embodiments for use with the streaming environment 110 and the platform server 120 as shown in FIG. 1. The representations within the screen shots are shown only for illustrative purposes. For example, contents within the screen shots may be omitted or added without limiting the scope of the claims.

Figure 5A:
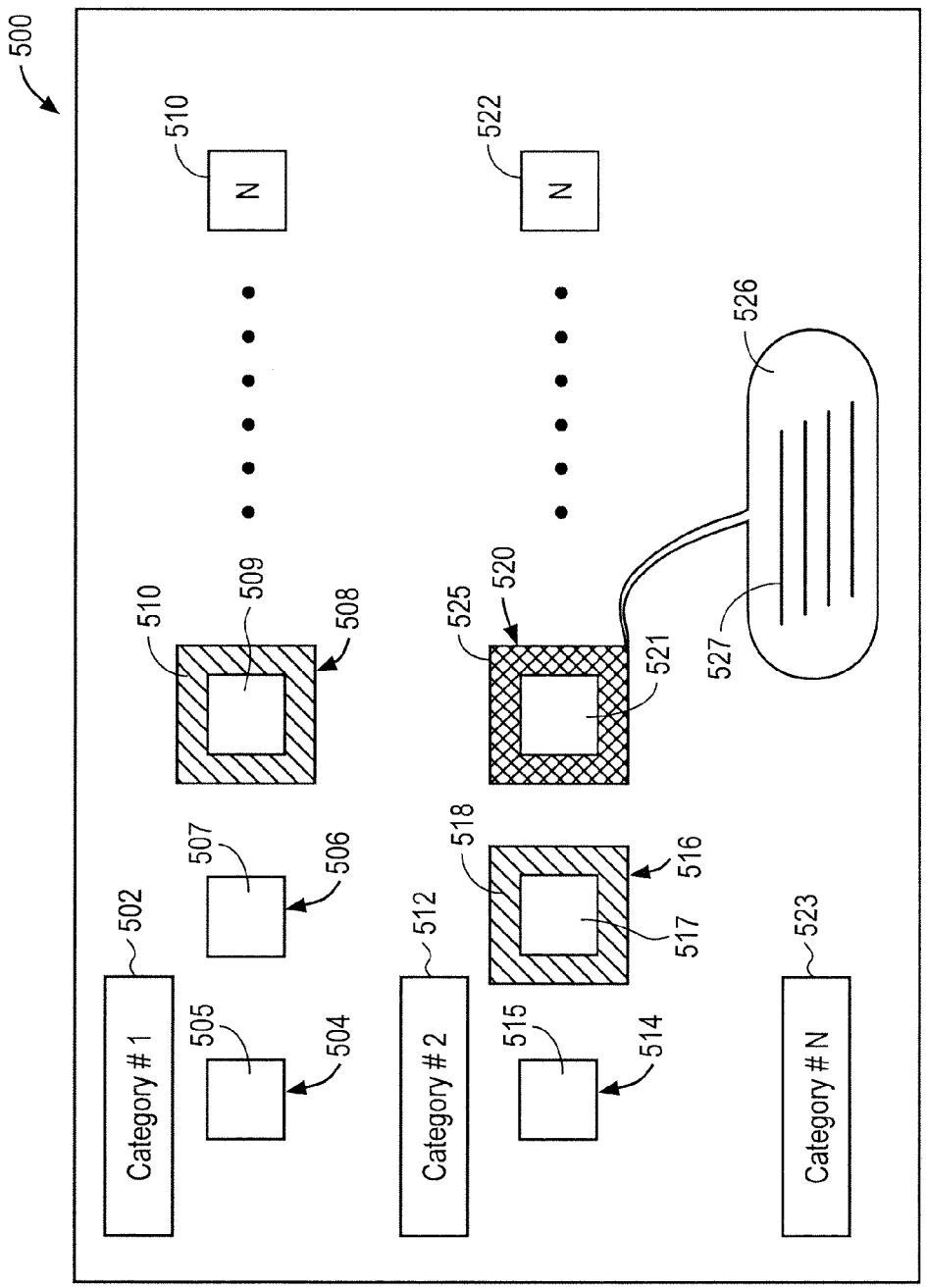
FIGS. 5A-7B illustrate exemplary screen shots according to embodiments of the invention.

FIG. 5A illustrates an exemplary screen shot 500 depicting a user interface for browsing for content through a client device 150. In one embodiment, the screen shot 500 is an exemplary home screen configured to browse for content through the client device 150 and transmitted from the platform server 120. The screen shot 500 includes category listings 502, 512, and 523; content listings 504, 506, 508, 510, 514, 516, 520, and 522; thumbnail displays 505, 507, 509, 515, 517, and 521; and indicators 510, 518, and 525.

In one embodiment, the category listings 502 and 512 represent categories for content such as movies, television shows, and games. In another embodiment, the category listings 502 and 512 represent a sub-category such as different types or genre of movies.

In one embodiment, the category listing 523 represents a row of content dedicated to a particular content provider. The particular content provider can populate this row of content with content chosen by the content provider. In one embodiment, the particular content provider is selected based on the subscriptions associated with the user account. For example, the particular content provider is selected, because the user account is subscribed to the particular content provider. In this example, the content within the category listing 523 that is provided by the particular content provider is accessible. In another example, the particular content provider is not currently subscribed to by the user account. In this example, the content provided by the particular content provider is available on a limited access. In one embodiment, the limited access includes: allowing full access while the content is listed within the category listing 523; and allowing access to a portion of the content as a preview. Further, the particular content provider could solicit a subscription for the user account prior to, during, or after allowing access to the content.

In one embodiment, the categories listings 502, 512, and 523 can be selectively pinned to the screen shot 500. Further, the categories listings 502, 512, and 523 are dynamically presented within the screen shot 500 depending on the browsing and selection habits. For example, if the content associated with the category listing 502 is not browsed or viewed over a period of time or selections, then the category listing 502 is moved towards the bottom of the screen such as below the category listing 512. In another example, any of the categories listings 502, 512, and 523 can also be prioritized based on paid placement by a content provider. For example, the category listing 512 can represent a sponsored content provider for listing content from the sponsored content provider that is associated with the category listing 512.

In one embodiment, each of the content listings 504, 506, 508, 510, 514, 516, 520, and 522 represents separate content. For example, if the category listing 502 is for comedy movies, then the content listings 504, 506, and 508 would represent movies that are also comedies.

In one embodiment, the thumbnail displays 505, 507, 509, 515, 517, and 521 show an image preview of the respective content associated with the content listings 504, 506, 508, 510, 514, 516, 520, and 522, respectively. In another embodiment, the thumbnail displays 505, 507, 509, 515, 517, and 521 show an animated series of preview images such as a video clip that is representative of the associated content.

In one embodiment, the indicators 510 and 518 represent content that is available to the client device 150. For example, the content listings 508 and 516 are available to the client device 150 as indicated by the indicators 510 and 518, respectively. In one embodiment, the content associated with the content listings 508 and 516 are available through a subscribed channel associated with a particular user account. In one embodiment, the subscribed channel does not requirement payment. In another embodiment, the subscribed channel is a paid subscription. In one embodiment, the remaining content listings 504, 506, 510, 514, 520, and 522 are available to a particular user by subscribing to the appropriate channel or purchasing the content.

In one embodiment, the content listings 504,506, 508, 510, 514, 516, 520, and 522 are found through the content listings data 345 within the platform database 125. For example, the content listings 504,506, 508, 510, 514, 516, 520, and 522 is responsive to a key word search inquiry. In another embodiment, the content listings 504,506, 508, 510, 514, 516, 520, and 522 are found through a home screen which is personalized by the user and associated with the user viewing data 310 associated with a particular user.

In one embodiment, a selection frame 525 is shown to surround the content listing 520. The selection frame 525 represents a selection, hovering, or highlighting of particular content within the screen 500. In one embodiment, an information box 526 corresponds with the content listing 520 and is activated by the selection from 525. The information box 526 and corresponding information 527 provides additional information about the content listing 520. The information box 526 and corresponding information 527 are selectively displayed based on the selection, hovering, highlighting of the content listing 520 which is shown by the selection frame 525.

Figure 5B:
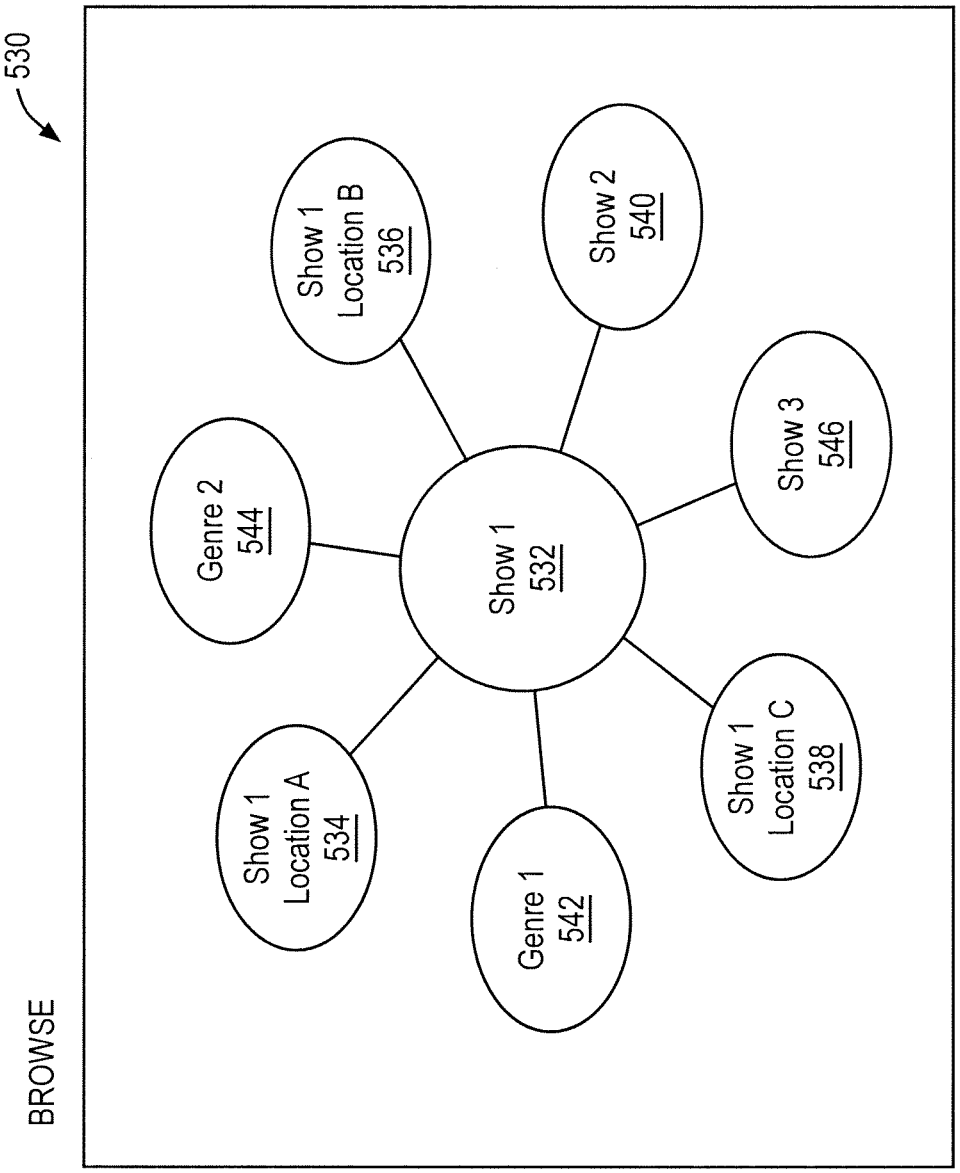

FIG. 5B illustrates an exemplary screen shot 530 depicting a user interface for browsing for content through a client device 150. In one embodiment, the screen shot is an exemplary home screen configured to browse for content through the client device 150 and is transmitted from the platform server 120. The screen shot 530 includes content listings 532, 534,536, 538, 540, 542, 544, and 546. In one embodiment, each of the content listings 532, 534,536, 538, 540, 542, 544, and 546 represents a separate content listing. In another embodiment, each of the content listings 532, 534,536, 538, 540, 542, 544, and 546 represents a separate channel that distributes content. In another embodiment, each of the content listings 532, 534,536, 538, 540, 542, 544, and 546 represents a separate software application. In another embodiment, each of the content listings 532, 534,536, 538, 540, 542, 544, and 546 represents a separate genre.

In one embodiment, the content listings 532, 534,536, 538, 540, 542, 544, and 546 are graphically displayed and each of the content listings 532, 534,536, 538, 540, 542, 544, and 546 is configured to be selected through a user of the client device 150.

In one embodiment, the content listings 533, 534, 536, and 538 represent content directly related to each other such as several related television series, different episodes that are part of a television series, and a movie and its related sequels. In this embodiment, the content listings 540 and 546 are related to the content listing 532 by being in the same genre. In this instance, if the content listing 532 is an action/adventure program, then the content listings 540 and 546 should be another action/adventure program. In this embodiment, the content listings 542 and 544 are in a different genre from the content listing 532 and each other. In this instance since the content listing 532 is an action/adventure program, the content listing 542 is a comedy program; the content listing 544 is a horror program.

In use, the content listings 532, 534,536, 538, 540, 542, 544, and 546 are presented based on the search/browse module 210 and are capable of being selected. Characteristics of the content listings such as tags, actors, directors, descriptions can be found within the content listings database 345. After selection of one of the content listings 532, 534,536, 538, 540, 542, 544, and 546, the selection is presented in a central location where the selected content listing (e.g., 532) takes the place of the prior content listing (e.g., 532). The rest of the content listings 534,536, 538, 540, 542, 544, and 546 are automatically updated with new content that is related to the newly selected content listing 532.

For example, if the content selection 532 is chosen, then the corresponding content is played. Further, if any of the content listings 533, 534, 536, and 538 are selected, then that particular content listing is placed in the position of the content listing 532. In this instance, the content listings 533, 534, 536, and 538 are updated based on directors or actors that are common with the newly selected content listing 532.

In one embodiment, each of the content listings 532, 534, 536, 538, 540, 542, 544, and 546 can selectively be highlighted to reflect that the content is available to the user. In one embodiment, each of the content listings 532, 534,536, 538, 540, 542, 544, and 546 can be graphically presented to have the size of the graphic representation mirror the amount of content associated with each of the content listings 532, 534, 536, 538, 540, 542, 544, and 546.

FIG. 5C illustrates an exemplary screen shot 550 depicting a user interface for viewing content results through a client device 150. In one embodiment, the screen shot is an exemplary home screen configured to browse for content through the client device 150 and is transmitted from the platform server 120. The screen shot 550 includes representative content 552 and content status 555, 556, and 557 which describe the available options for a user to view the content 552 through the client device 150.

In one embodiment, the content status 555 represents a subscribed channel that offers the content associated with the content 552 as available now to the client device 150. For example, provider 557 and provider 558 are listed within the content status 555. In this example, the provider 557 is offering the content 552 now at no extra cost as part of the subscription to the provider 557. Further, the provider 558 is offering the content 552 now at an additional cost in addition to the subscription to the provider 557. The subscription to either provider 557 or 558 may be free or require payment. The details of the additional payment can be found in the detail column 559.

In one embodiment, the content status 556 represents a subscribed channel that offers the content associated with the content 552 as available soon to the client device 150. For example, provider 561 and provider 564 are listed within the content status 562. In this example, the provider 561 is offering the content 552 approximately 1 week from now at no extra cost as part of the subscription to the provider 561.

Further, the provider 564 is offering the content 552 in the future as the #2 position on a waitlist. Although not show, the detail column 559 for the provider 564 could also provide an estimated time when the content 552 will be available. The provider 564 contemplates a model where a user is subscribed to the provider 564 and the provider has a limited number of available copies of the content 552. After the available copies of the content 552 are checked out to other users, additional users wishing to get access to the content 552 are placed on a wait list until one of the available copies are released.

In one embodiment, an alert option is available in the details column 559 for the content status 556. In this example, an alert message is provided to the user through the client device, email, or text message when the content 552 becomes available.

In one embodiment, the content status 567 represents channels that are currently not subscribed by the user and offer the content associated with the content 552 as available now to the client device 150. For example, provider 568 and provider 569 are listed within the content status 567. In this example, the provider 568 is offering the content 552 as a single item purchase. Further, the provider 569 is offering the content 552 now as part of a subscription to the provider 569. The details of the additional payment can be found in the detail column 559.

In another embodiment, the content status 567 can also provide a suggestion for different content supplied by a sponsoring content provider. For example, the selection of the different content to be suggested is determined by the sponsoring content provider. The sponsoring content provider can pay a fee for this placement.

In one embodiment, the content listings 555, 556, and 567 and associated data are shown within the screen shot 550 in any combination. In another embodiment, the content providers 557, 558, 561, 564, 568, and 569 are shown in order of subscription within screen shot 550. For example, content providers that are subscribed to by the user's account are shown first. In another embodiment, the content providers 557, 558, 561, 564, 568, and 569 are shown in order of cost within screen shot 550. For example, content providers that are free or cheaper are shown first. In another embodiment, the content providers 557, 558, 561, 564, 568, and 569 are shown in order of paid placement within screen shot 550. For example, content providers that pay for placement are shown first. Any combination of subscription, cost, and paid placement may be utilized.

Figure 5D:
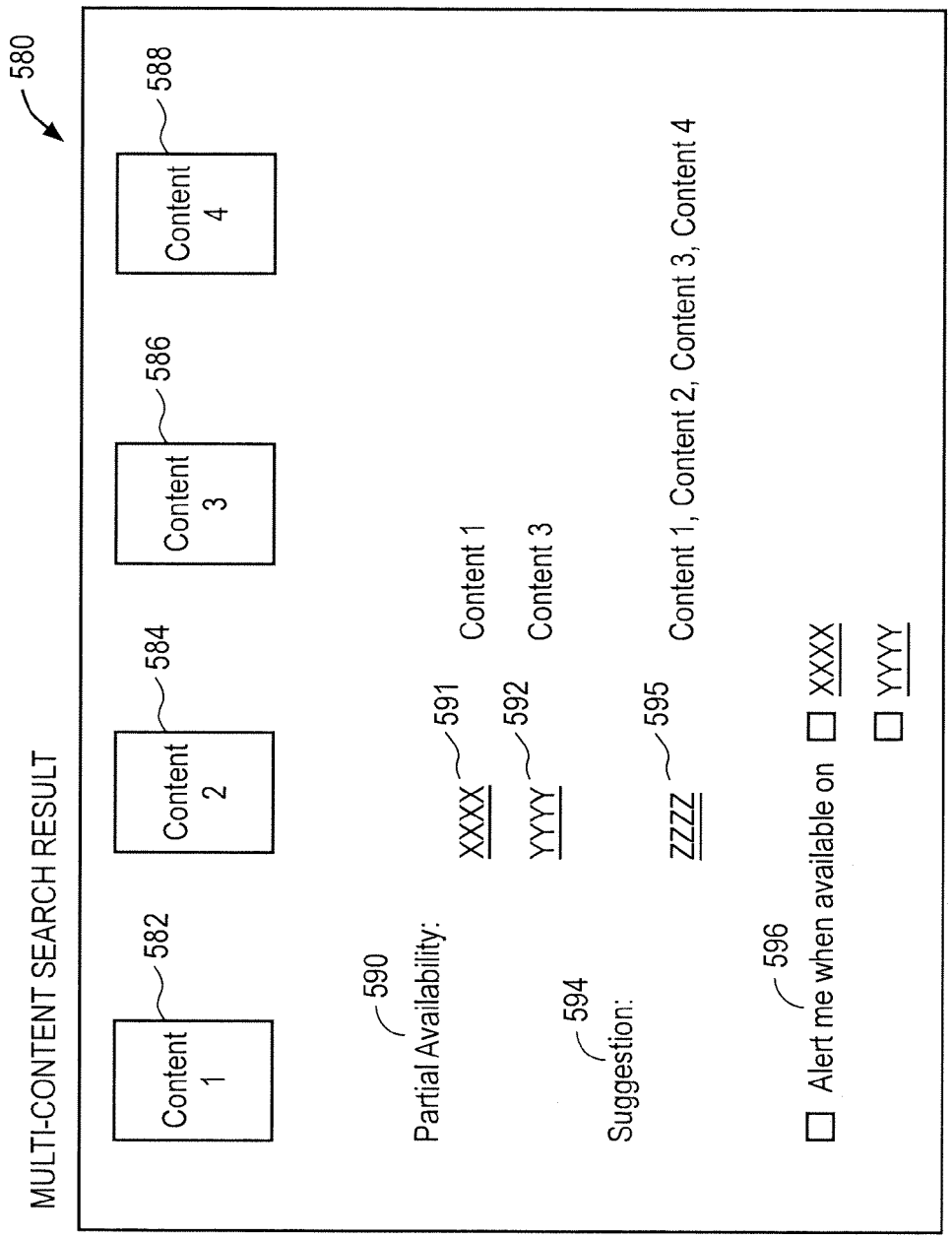

FIG. 5D illustrates an exemplary screen shot 580 depicting a user interface for viewing content results through a client device 150. In one embodiment, the screen shot is an exemplary home screen configured to browse for content through the client device 150 and is transmitted from the platform server 120. The screen shot 580 includes representative content 582, 584, 586, and 588; and content status 590 and 594; and content providers 591, 592, and 595. In one embodiment, the representative content 582, 584, 586, and 588, correspond with content such as videos, music, and applications. In one embodiment, the representative content 582, 584, 586, and 588 are provided by the platform server 120. In one instance, representative content 582, 584, 586, and 588 is based on searches for content. For example, the search for content may occur in a single search or over multiple searches spanning a period of time.

In one embodiment, the content status 590 presents a result where there is partial availability of the representative content 582, 584, 586, and 588. For example, the content provider 591 shows availability of the representative content 582, and the content provider 592 shows availability of the representative content 586. In one embodiment, the content status 594 presents a suggestion that content provider 595 can fulfill content associated with the representative content 582, 584, 586, and 588. In one embodiment, an alert option 596 allows the selection of receiving an alert when additional content becomes available through the content providers 591 and 592.

Figure 6:
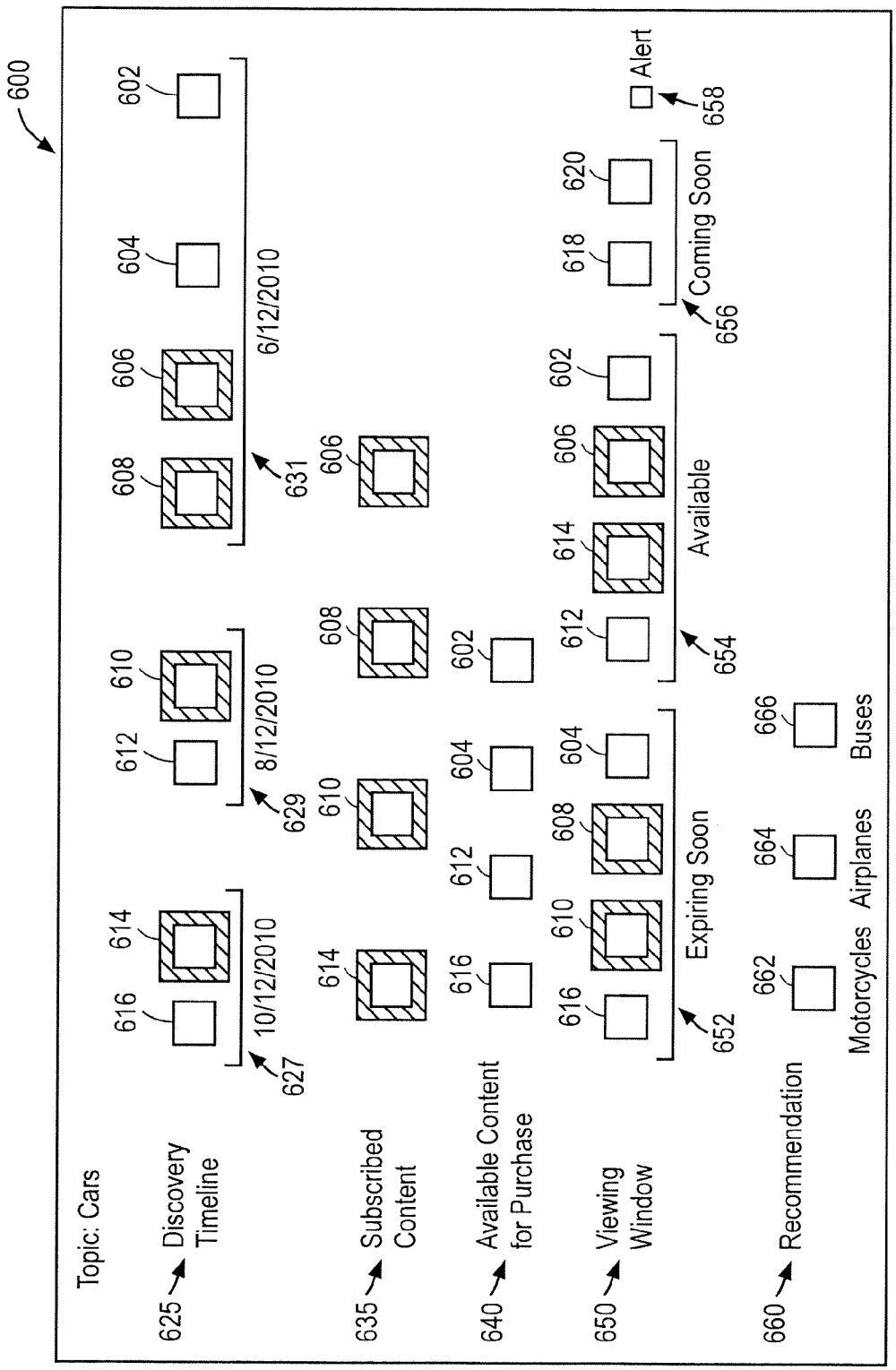

FIG. 6 illustrates an exemplary screen shot 600 depicting a user interface for viewing a pinned and updated search result through a client device 150. In one embodiment, the screen shot is an exemplary home screen configured to browse for content through the client device 150 and is transmitted from the platform server 120. The screen shot 600 includes representative content 602, 604, 606, 608, 610, 612, 614, 616, 618, and 620, which correspond with content such as videos, music, and applications. In one embodiment, the representative content 602, 604, 606, 608, 610, 612, 614, 616, 618, and 620 are provided by the platform server 120. In one instance, representative content 602, 604, 606, 608, 610, 612, 614, 616, 618, and 620 is based on a search for content related to "cars". In this embodiment, the search for content is performed at different times with additional results each time the search is updated.

For example, the representative content 602, 604, 606, 608, 610, 612, 614, and 616 is displayed through a discovery timeline 625. A time period 631 is representative of a search result conducted on Jun. 12, 2010, and includes the representative content 602, 604, 606, and 608 as a result of the search. A time period 629 is representative of an updated search result conducted on Aug. 12, 2010, and includes the representative content 610 and 612 as a result of the updated search. A time period 627 is representative of an updated search result conducted on Oct. 12, 2010, and includes the representative content 614 and 616 as a result of the updated search.

In one embodiment, a subscribed content listing 635 displays subscribed and available content search results from the discovery timeline 625. In this instance, the subscribed content listing 635 includes the representative content 606, 608, 610, and 614.

In another embodiment, the subscribed content listing 635 may include promotional content that is available on a promotional basis. However, the user account is not subscribed to receive additional content from the content providers that are supplying the promotional content. For example, the promotional content would not normally be available to the user account from the content provider. Further, the offer to subscribe to the content provider can be made before, during, or after streaming the promotional content to the user account. In another embodiment, the promotional content may only be accessible for a segment of the content and an offer to purchase the entire content is made to the user account.

In one embodiment, an available content for purchase listing 640 displays content that is available for purchase from the discovery timeline 625. In this instance, the available content for purchase listing 640 includes the representative content 602, 604, 612, and 616. In one embodiment, an alert notification option 642 is provided to allow a user to be alerted if content within the available content for purchase listing 640 becomes a subscribed content for the user.

In one embodiment, a viewing window listing 650 organizes content based on when the content is available. For example, the viewing window listing can have an expiring soon category 652, an available now and going forward category 654, and a coming soon category 656. In this instance, the representative content 602, 604, 606, 608, 610, 612, 614, and 616 which are found in the discovery timeline 652 are shown in either the expiring soon category 652 or available now and going forward category 654. The representative content 618 and 620 are shown in the coming soon category 656 and have an alert option 658 to alert the user when the representative content 618 and 620 is available.

In one embodiment, a recommendation listing 660 is provided to recommend additional recommended topics based on the topic. In one embodiment, the recommended topic is made based on what other users who are also interested in the topic listed which in this case is "cars" would also have as additional topics. In this example with "cars" as the topic, additional topics such as motorcycles 662, airplanes 664, and buses 666 are also listed.

In another embodiment, the recommendation listing 660 allows a content provider to recommend content that is similar or related to the original "cars" search topic. In this embodiment, the content provider limits the recommendations based on the available content offered by this particular content provider. In one embodiment, the particular content provider is selected from a subscribed content provider associated with the user account. In another embodiment, the particular content provider is not a subscribed content provider nor related to the user account. In one example, the particular content provider pays an advertising fee to be selected and further pays a referral fee if the user account subscribes to the particular content provider.

Figure 7A:
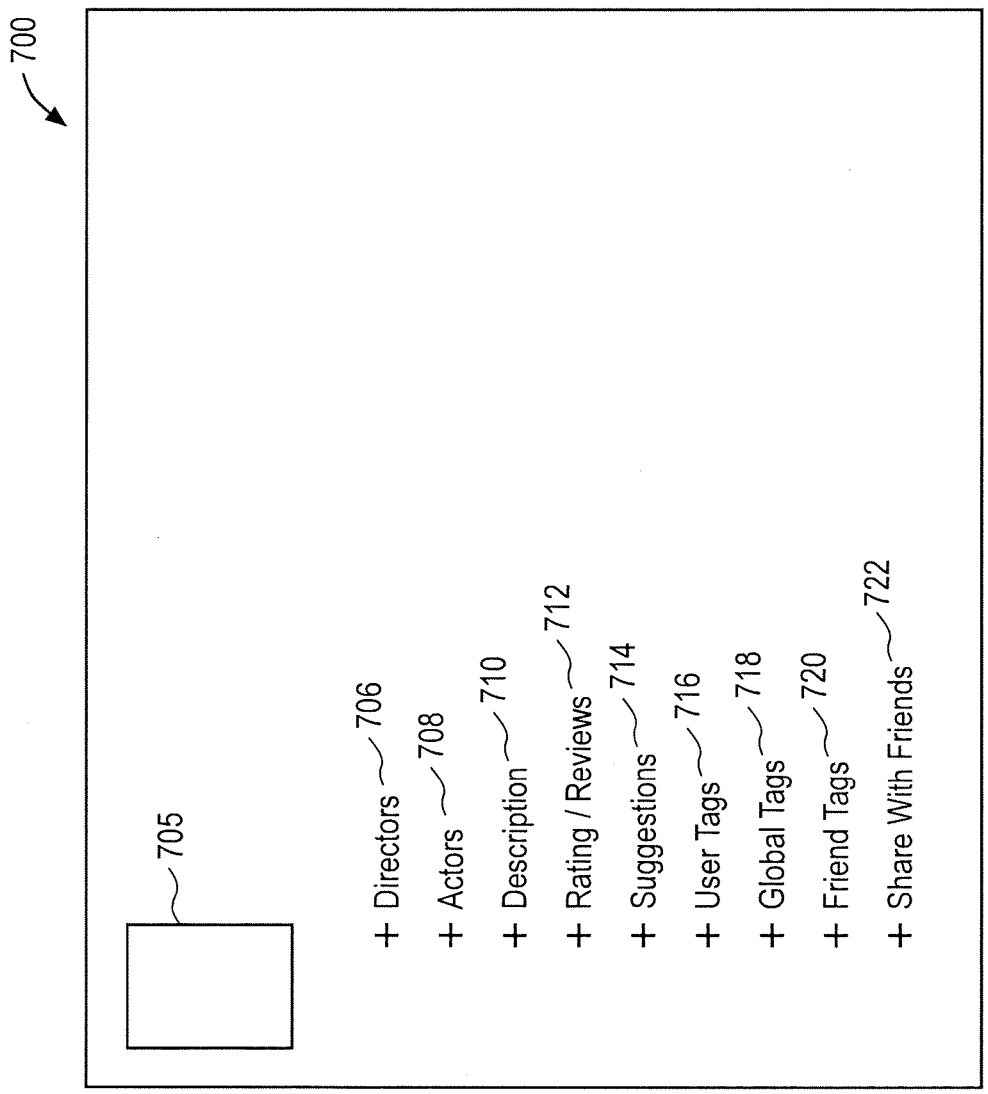

FIG. 7A illustrates an exemplary screen shot 700 depicting a user interface for viewing additional data through a secondary screen on the input device 170. In one embodiment, the input device 170 includes a display screen which serves as the secondary screen. For example, a smart phone or portable tablet can be utilized as the input device 170. In one embodiment, the screen shot 700 on the secondary screen is an extension of the display 140.

In one embodiment, the screen shot 700 includes a representative content 705 and additional information relating to the representative content 705 such as directors 706, actors 708, description 710, rating/reviews 712, suggestions 714, user tags 716, global tags 718, friend tags 720, and share with friends 722. In one embodiment, the representative content 705 is content that is being watched, selected, or highlighted on the display 140 through the client device 150. For example, the additional information can be displayed on the secondary screen as depicted within the screen shot 700 as the representative content 705 is selected on the display 140. The additional information presented on the secondary display through the input device 170 provides further details of the representative content 705. The additional information including directors 706, actors 708, description 710, rating/reviews 712, suggestions 714, user tags 716, global tags 718, friend tags 720, and share with friends 722 is customizable to provide further details.

In one embodiment, the ratings/reviews 712 are generated from the user or provided by a third party. The suggestions 714 are offered to the user or can be selected to be suggestions from the user. The user tags 716 are tags that are generated by the user; global tags 718 are generated by other users and aggregated; and the friends tags 720 are tags that are from friends of the user. The share with friends 722 is content that is selected to be shared with friends of the user.

Figure 7B:
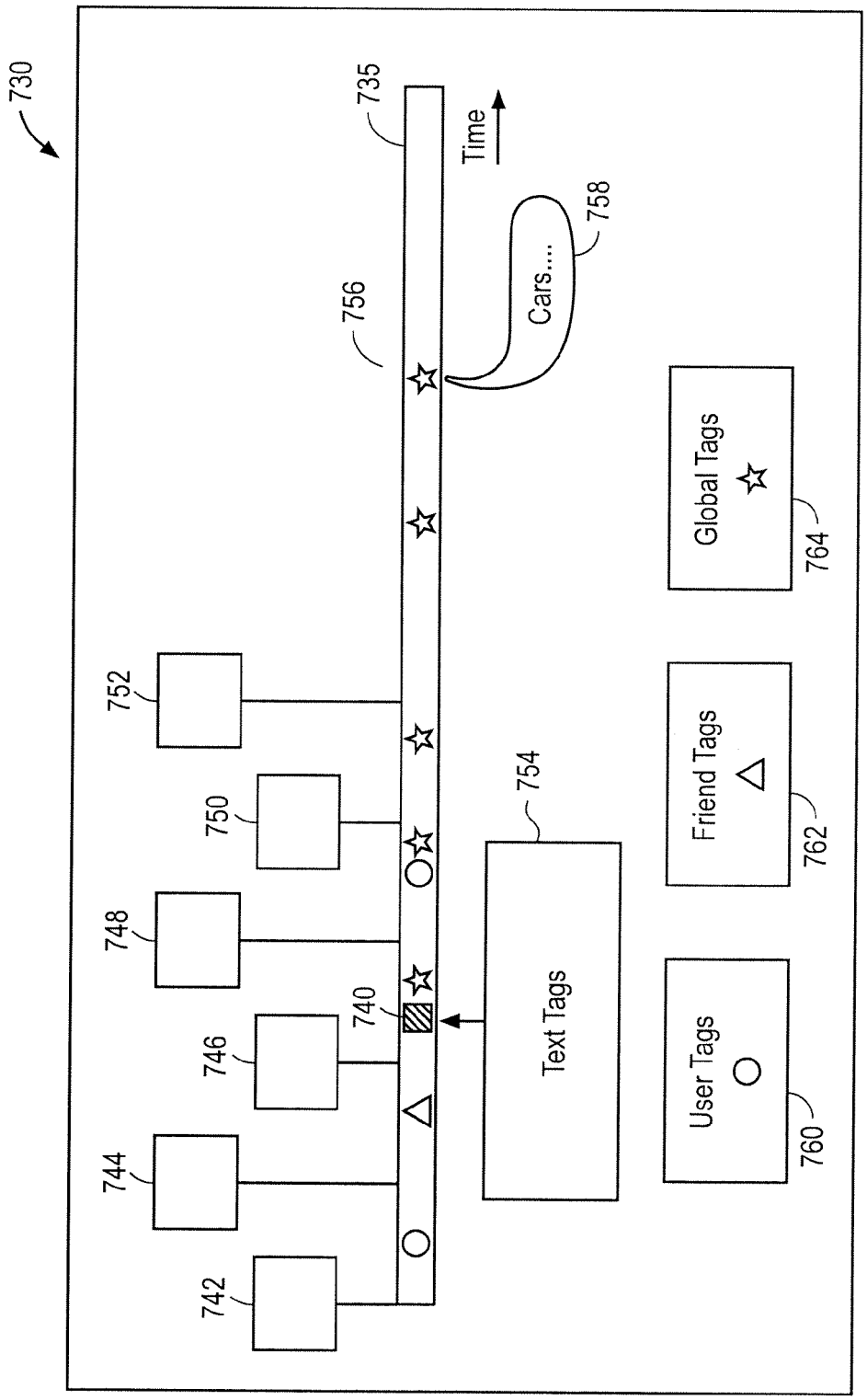

FIG. 7B illustrates an exemplary screen shot 730 depicting a user interface for viewing additional data through a secondary screen on the input device 170. In one embodiment, the input device 170 includes a display screen which serves as the secondary screen. For example, a smart phone or portable tablet can be utilized as the input device 170. In one embodiment, the screen shot 730 on the secondary screen is an extension of the display 140.

A timeline 735 represents a progress playing bar for content. The timeline 735 illustrates content progress as it is being played on the display 140. A progress indicator 740 shows a play location within the content such as a movie. For example, the beginning of the movie is towards the left side of the timeline 735. In one embodiment, the timeline 735 and progress indicator 740 correspond with the content being viewed on the display 140. Further, a second view is provided through the input device 170 which includes additional information on the content being viewed on the display 140.

In one embodiment, representative images 742, 744, 746, 748, 750, and 752, are shown with respect to a position on the timeline 735 and correspond with a visual representation of the content at that particular position within the content. In one embodiment, the display of the content through the display 140 can be set to a playtime associated with a position on the timeline 735. An information area 754 allows information regarding the content to be displayed that is temporally relevant to the position of the progress indicator 740. Further, a user tag legend 760, friend tag legend 762, and global tag legend 764 provide symbols for tags originating from the user, a friend, and aggregated global tags from multiple users, respectively. A tag representation 756 illustrates how tags can be graphically shown on the timeline 735. In one embodiment, the tag is correlated temporally with the content associated with the portion of the timeline 735. Further, a tag display 758 is configured to display text of a tag associated with the tag representation 756. In one embodiment, the tag display 758 selectively displays the text of a tag when the tag representation 756 is selected. In another embodiment, other tag representations can be selected with a corresponding tag display being activated to show the tag.

FIGS. 8A, 8B, 9, 10, 11, 12A, 12B, 13, 14,15, and 16 illustrate flow diagrams showing exemplary embodiments for use with the streaming environment 110 and the platform server 120 as shown in FIG. 1. The blocks within the flow diagrams are shown only for illustrative purposes. For example, blocks within the flow diagram can be further divided, combined or performed in a different order without limiting the scope of the claims.

Figure 8A:
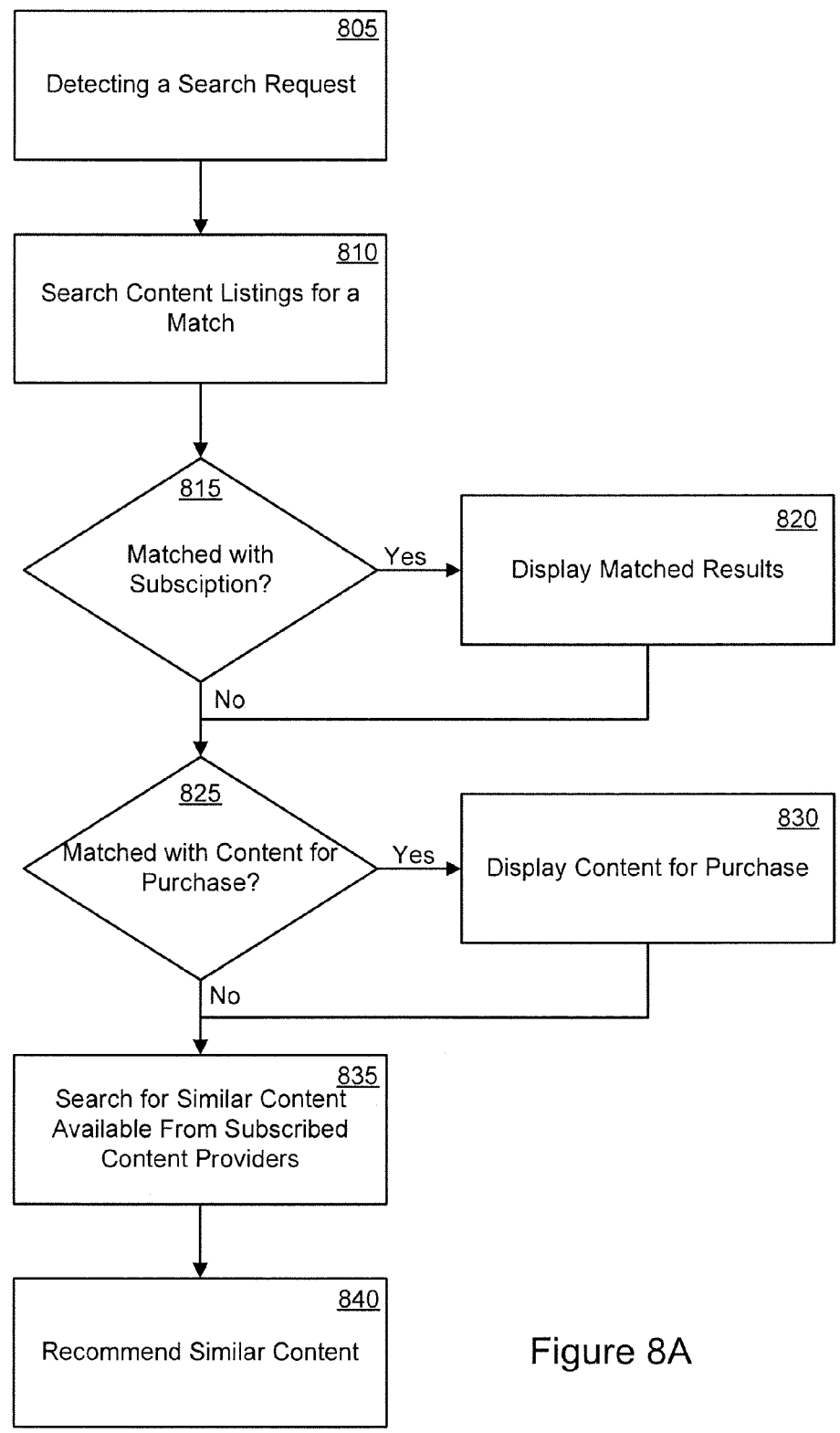
FIGS. 8A-16 illustrate flow diagrams according to embodiments of the invention.

FIG. 8A illustrates a search for content among multiple content providers through a client device 150 or input device 170 while leveraging the platform server 120. In Block 805, a search request is detected. In one embodiment, the search request comes through the client device 150 and is related to a particular user subscription data 305. In another embodiment, the search request comes through the input device 170. The search request can be made for content such as software applications, movies, television shows, and music. In one embodiment, the search/browse module 210 accomplishes the search request.

In Block 810, the search request is matched with content listings. In one embodiment, the content listings are stored within the content listings data 345. In one embodiment, the match module 215 accomplishes the match.

If the match with the content listings returns a match with subscribed content in Block 815, then the subscribed content that matches the search results is displayed in Block 820. In one embodiment, the subscribed content includes qualifying content within subscribed channels through a content provider. For example in some instances, not all content provided by a content provider is included with a subscription to the content provider. The subscribed content includes movies, television programs, games, and music.

If the match with the content listings returns a match with purchased content in Block 825, then the purchased content that matches the search results is displayed in Block 830. In one embodiment, the purchased content includes movies, television programs, games, and music purchased by the user.

In one embodiment, the display module 230 accomplishes the display action in Blocks 820 and 830. In Block 835, a search is performed for similar content that is available to the user from subscribed content providers. In one embodiment, the similar content does not match the search request in the Block 805 but instead shares similar characteristics to the original search request and the matched subscribed and purchased content. Further, the similar content is intended as a suggestion or recommended content. For example, if the matched content either subscribed or purchased is related to the genre of action/adventure movies, then the similar content would also be within the action/adventure movies genre. In other instances, similar content can be related through common actors, directors, and time periods.

In another embodiment, the similar content can be suggested from a content provider that would require purchase or subscription to be viewed. In Block 840, the similar content is displayed. In one embodiment, subscribed content, purchased content, and similar content are displayed. In another embodiment, only the subscribed content and purchased content are displayed. In one embodiment, the recommendation module 235 would be utilized in Block 835 and 840 for searching and recommending content.

Figure 8B:
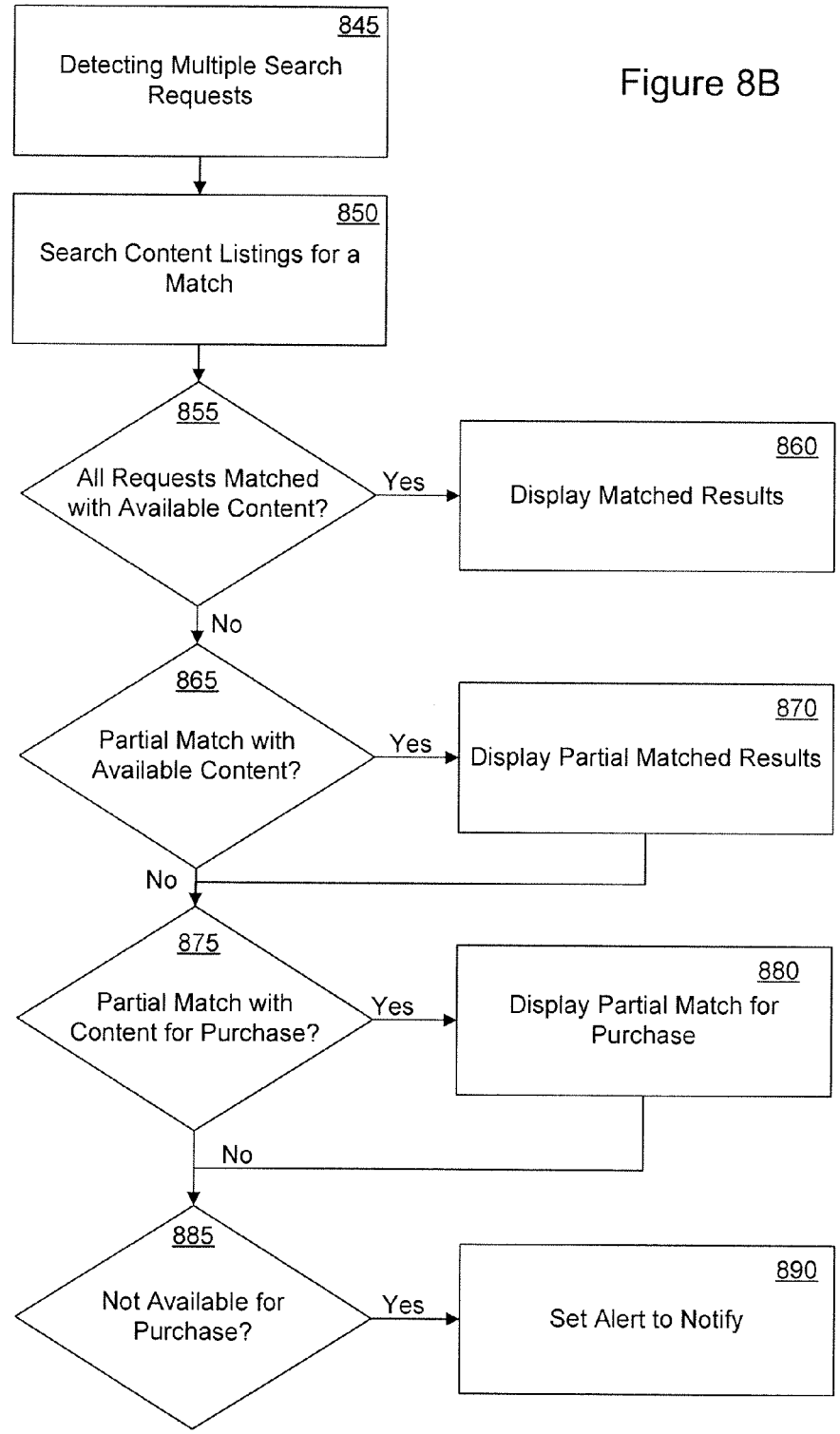

FIG. 8B illustrates a search for content among multiple content providers through a client device 150 or input device 170 while leveraging the platform server 120. In Block 845, multiple search requests are detected. In one embodiment, the multiple search requests come through the client device 150 and are related to a particular user account's subscription data 305. Further, the multiple search requests are stored within the user viewing data 310. In another embodiment, the multiple search requests come through the input device 170. The search requests can be made for content such as software applications, movies, television shows, and music. In one embodiment, the search/browse module 210 accomplishes the search request.

In Block 850, the search requests are matched with content listings. In one embodiment, the content listings are stored within the content listings data 345. In one embodiment, the match module 215 accomplishes the match.

If the match with the content listings returns a match of all search requests with available content in Block 855, then the available content that matches the search results are displayed in Block 860. In one embodiment, the available content includes content that can be accessed through a content provider without additional charges. For example in some instances, the available content could be available through a specific purchase, available through a subscription, or available because the content is free. The available content includes movies, television programs, games, and music.

If all the search requests are not matched with available content in Block 855, then a partial match is explored in Block 865. If the match with the content listings returns a partial match of all search requests with available content in Block 865, then the available content that matches the search results are displayed in Block 870.

If all the search requests are not matched with available content in Block 855, then a match with content for purchase is explored in Block 875. If the match for content outside of available content returns a match for remaining content for purchase in Block 875, then the content for purchase is displayed in Block 880. In one embodiment, the display module 230 accomplishes the display function in Block 860, 870, and 880.

If there is content from the multiple search requests that is not included as available content or content for purchase within Block 885, then an alert is set in Block 890 to notify the account holder when the content becomes available for purchase or is included as available content to the account holder.

In one embodiment, the alert can be an email, sms, or voicemail notification through the client device 150 or the input device 170.

Figure 9:
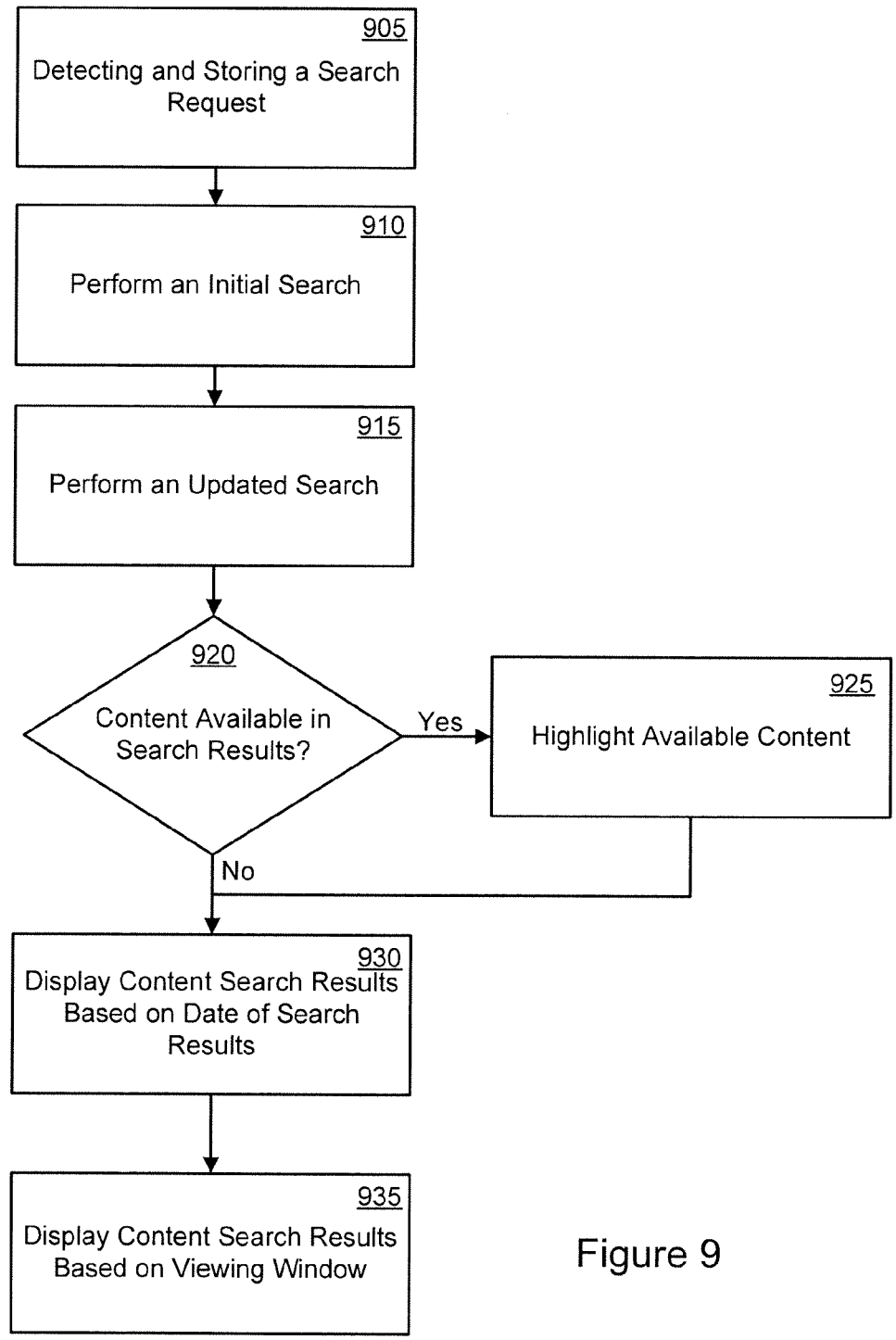

FIG. 9 illustrates a persistent search for content among multiple content providers through a client device 150 or input device 170 while leveraging the platform server 120. In Block 905, a search request is detected and stored. In one embodiment, the search request comes through the client device 150 and is related to a particular user subscription data 305. In another embodiment, the search request comes through the input device 170. The search request can be made for content such as software applications, movies, television shows, and music. Further, the search request is stored within the user viewing data 310. In one embodiment, the store module 230 accomplishes the storing function.

In Block 910, an initial search is performed based on the search request and the resulting content based on the initial search is stored. Searching for content can utilize the user tagging data 320, public tagging data 340, and/or content listings data 345. In one embodiment, the content listings are stored within the content listings data 345.

In Block 915, an updated search is performed based on the search request which mirrors the initial search in Block 910. The updated search can be performed at any time after the initial search. Further, the resulting content based on the updated search is stored. In one embodiment, the resulting content based on the updated search encompasses additional content beyond the resulting content from the initial search.

If there is available content detected in Block 920, then the available content is highlighted in Block 925. In one embodiment, available content includes content that is subscribed to, purchased by, and offered for free to the account holder associated with the client device 150 or the input device 170.

In Block 930, the resulting content from the initial search and the updated search are displayed together based on the timing of the initial search and the updated search. Further, the differentiation between available content and content for purchase is also displayed in one embodiment. An exemplary display is shown in the discovery timeline 625 in FIG. 6.

In Block 930, the resulting content from the initial search and the updated search are displayed together based on a viewing window of the resulting content. An exemplary display is shown in the viewing window 680 in FIG. 6.

Figure 10:
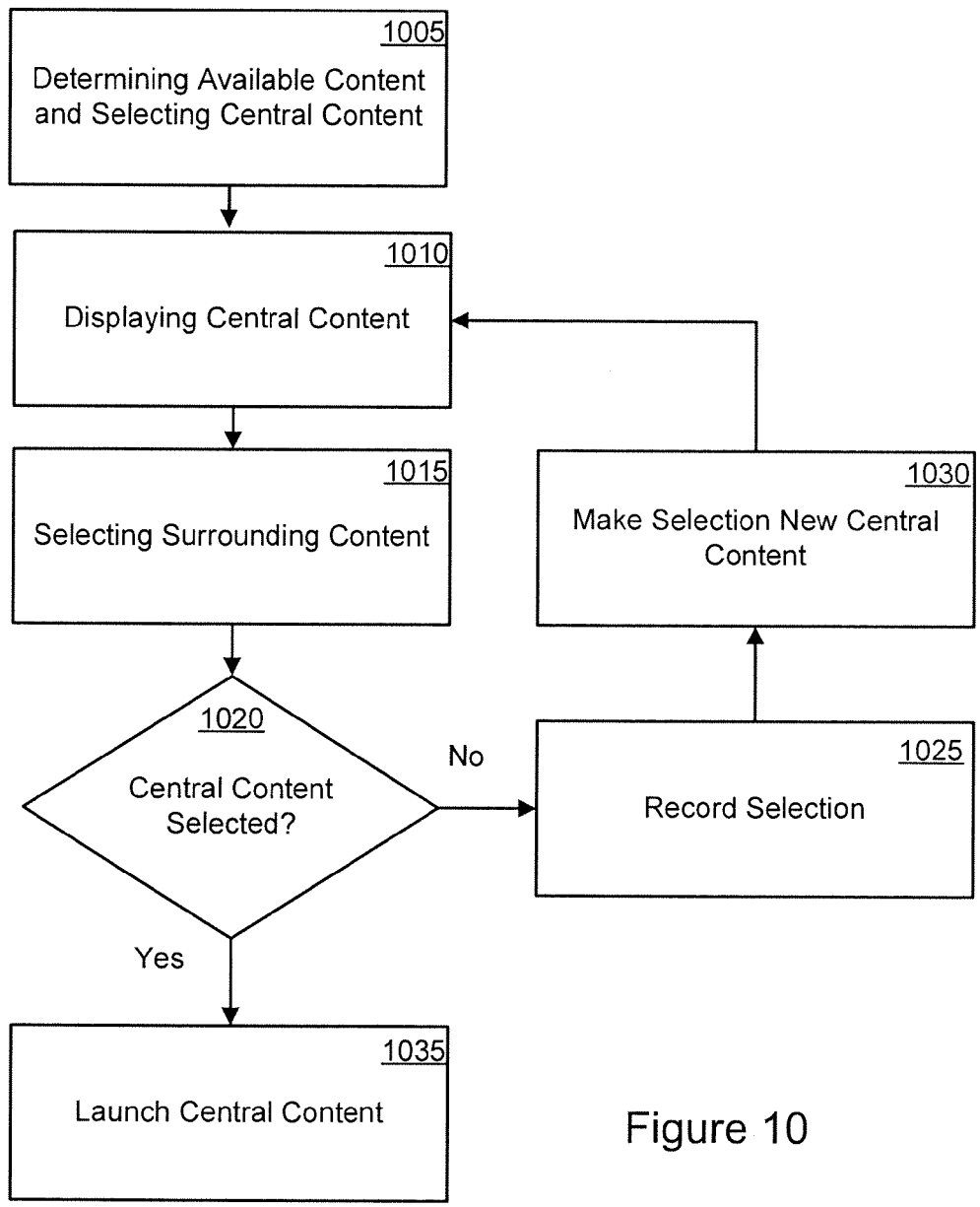

FIG. 10 illustrates an interactive, dynamic browsing of content through a client device 150 or input device 170 while leveraging the platform server 120. In Block 1005, available content associated with the client device 150 is identified and central content is selected. In one embodiment, available content includes content available to the client device 150 because the content has already been purchased, is included as part of a subscription which the client device 150 can access, or available because the content is offered for free. In another embodiment, available content also includes content that can be purchased or subscribed to through the client device 150 for additional payment.

In one embodiment, the selection as the central content is based on prior content watched through the user viewing data 310, user subscription data 315, user tagging data 320, public viewing data 335, and/or public tagging data 340.

In Block 1010, the central content is displayed. In one embodiment, the content listing 532 (shown in FIG. 5B) is exemplary central content. In one embodiment, the display module 230 accomplishes the display function.

In Block 1015, surrounding content is selected from the available content. In one embodiment, content listings 534, 536, 538, 540, 542, 544, and 546 (shown in FIG. 5B) are exemplary surrounding content. Selection of the surrounding content is from the available content. In one embodiment, criteria for selection of the surrounding content includes similarity and differences between genre, artists, actors, directors, and sequels relative to the central content. In one embodiment, selecting the surrounding content is accomplished through the search/browse module 210.

In Block 1020, selection of the central content and surrounding content is monitored. If the surrounding content is selected, then the selection is recorded in Block 1025. The selected surrounding content is made the new central content in Block 1030. In Block 1015, the surrounding content is selected based on new central content and additional information gained through the selection that is recorded within the Block 1025. For example, if the original central content was a horror movie and the surrounding content that was selected was a documentary program, the new surrounding content would not be within the horror movie genre. In one embodiment, the store module 230 accomplishes the recording function.

If the central content is selected in Block 1020, then the central content is launched in Block 1035. If access to the central content requires payment, an offer to purchase, rent or subscribe to receive the central content is offered through the interface.

Figure 11:
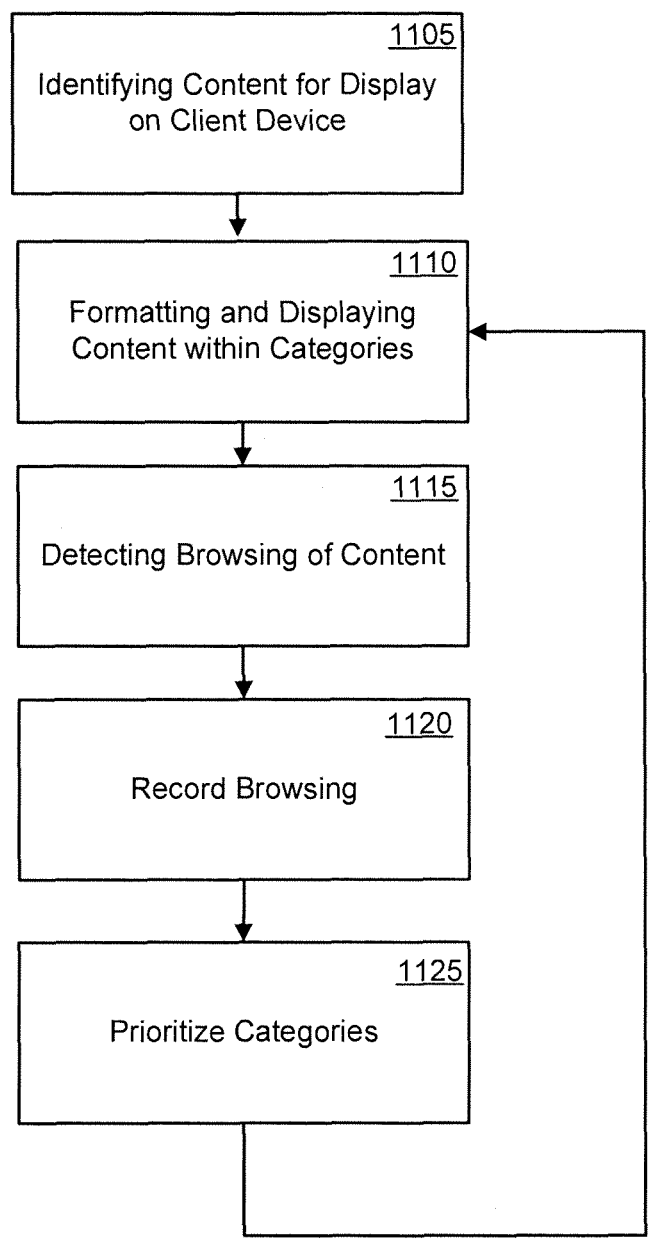

FIG. 11 illustrates dynamic prioritization of content through interactive browsing of content through a client device 150 or input device 170 while leveraging the platform server 120. In Block 1105, available content for display on the client device 150 is identified. In one embodiment, the available content includes content available to the client device 150 because the content has already been purchased, is included as part of a subscription which the client device 150 can access, or is available because the content is offered for free. In another embodiment, the available content also includes content that can be purchased or subscribed to through the client device 150 for additional payment.

In another embodiment, content through a sponsored content provider is also included whether or not the client device 150 is subscribed to a channel associated with the sponsored content provider. In one embodiment, the match module 215 within the platform module 130 identifies the content. In this example, the content is stored at the content source 135 with the details and listing information of the content stored within the content listing data 345 within the platform database 125.

In Block 1110, the content is organized within categories and displayed within the category listings. In one embodiment, the category listing is created based on the subject matter of the content. For example, the additional details and listing information of the content is found within the content listing data 345 and public tagging data 340 to provide subject matter information about the content.

In another embodiment, the categories are preset and the content is sorted into the preset categories. For example, preset category listings can include "comedy", "mystery", "sports", and the like. Further, the preset category listing can also include a listing of a specific content provider where the content displayed under the specific content provider as a preset category is sourced from the specific content provider.

FIG. 5A illustrates an exemplary manner in which categories and their associated content are displayed. In Block 1115, browsing of the content within categories is detected. In one embodiment, browsing is performed by highlighting or hovering over content as information about the content such as descriptions, cover art, and video clips are displayed. In another embodiment, browsing is performed by specifically selecting the content to view additional information about the content. Further examples of highlighting and hover are shown as the selection frame 525 in FIG. 5A. Further, additional information is shown in the information box 526 and corresponding information 527 in FIG. 5A. In one embodiment, the search/browse module 210 within the platform module 130 detects and selects categories based on browsing.

In Block 1120, the browsing activity is recorded. In one embodiment, the browsing activity is recorded within the user viewing data 310. In one embodiment, the store module 220 accomplishes recording of the browsing activity.

In Block 1125, the categories are prioritized. In one embodiment, the prioritization is based on the browsing activity. For example, unpopular categories that include content which is not browsed or viewed are moved towards the bottom of the screen. For example referring to FIG. 5A, if content within the category 502 are not viewed or browsed, then the category 502 and the associated content is moved below the category 512. In another embodiment, unpopular categories and their associated content are removed and no longer displayed.

In another embodiment, the prioritization is based on current subscription associated with the client device 150. For example, the category listings are ordered based on whether the content within the category listing is subscribed or available content to the client device 150. The category listings with the most subscribed or available content are positioned at the top of the listings.

In another embodiment, the prioritization of the category listings is based on preferred placement of a content provider. For example, a preferred content provider can be placed as a category listing where the content associated with this category listing is content originating from the content provider. In this example, the preferred content provider assigns the content listings to be displayed under the respective category listing. In one embodiment, the preferred content provider is currently subscribed to by the client device 150 and provides available content to the client device 150. In another embodiment, the preferred content provider is not currently subscribed to by the client device 150 and is capable of presenting content as a promotion to the client device 150. Although the content listings are described as being associated with categories, channels can be utilized in place of content listings and also be associated with corresponding categories.

Figure 12A:
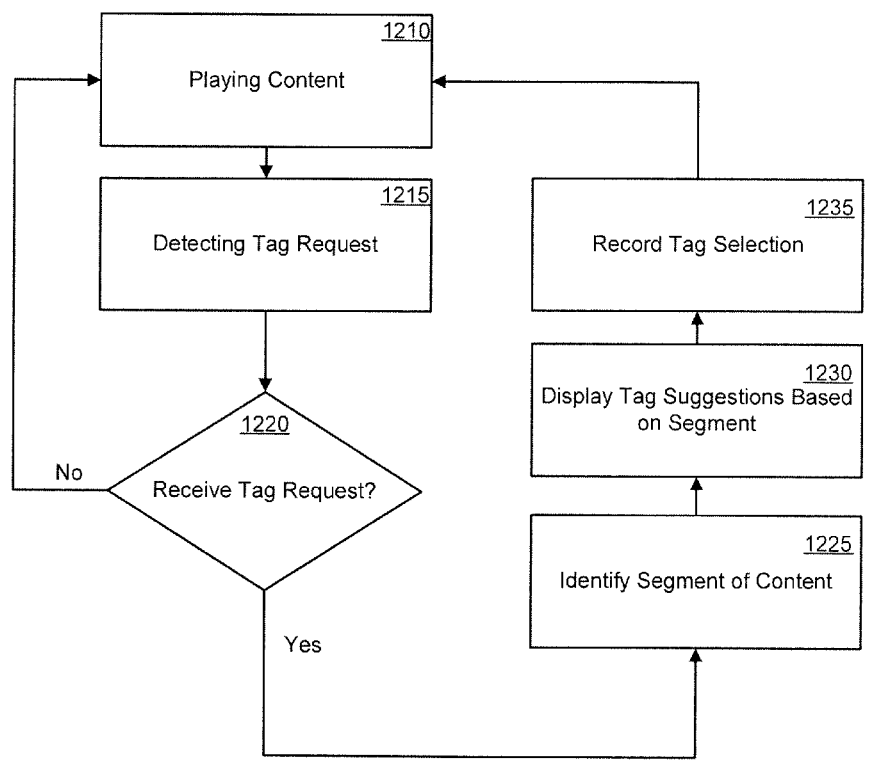

FIG. 12A illustrates a process of tagging content through a client device 150 or input device 170 while leveraging the platform server 120. In Block 1210, content is being played. In one embodiment, the content is being played through the client device 150. In another embodiment, the content is being played through the input device 170. The content can include movies, television shows, music, and games.

In Block 1215, a tag request is detected. In one embodiment, the tag request is detected in response to the content being played in the Block 1210. In one example, as the content is being viewed through the client device 150, the tag request can be detected by the input device 170. In this instance, the tag request is related to the portion of content being viewed through the client device.

If the tag request is received in Block 1220, then the segment of the content associated with the tag request is identified in Block 1225. In one embodiment, the content is divided among multiple segments. In one example, if the content is a movie, the movie is divided into 10 second segments. In another example, the movie is divided into variable length segments based on the length of each scene within the movie. In one embodiment, the segments are provided by the content creator such as the television show producer. In one embodiment, the segments for the content are stored within the content listing data 345.

In Block 1230, tag suggestions are displayed based on the segment. In one embodiment, tag suggestions are found by the tags stored within the public tagging data 340 that correspond with the particular segment. The public tagging data 340 can include tags selected by other users; tags selected by content providers; and tags found in closed captioning or subtitled text. The frequency and source of the tags within the public tagging data 340 can determine which tags are suggested. In one embodiment, tags provided by content providers or within subtitles or closed captioning are given additional weight when compared to tags from other users. In one embodiment, a drop down menu is provided with the tag suggestions so that tag selection can be performed through a simplified on-screen interface and selection control is through the use of the input device 170. In another embodiment, voice control can be used to select the tag for the segment.

In another embodiment, the user can begin entering a tag with letters and dynamically suggest a complete tag based on the initial letters and tags from other users, content providers, subtitles, and closed captioning. If the user enters a tag that is new, then this new tag can be included within the corpus of tags found within the public tagging data 340.

In Block 1235, the selected tag is recorded. In one embodiment, the selected tag is stored within the user tagging data 320 which is reserved for access by the account holder. The selected tag can also be stored within the public tagging data 340 in aggregate which would not identify the account holder. In both cases, the tag would be correlated with the segment associated with the specific content.

In another embodiment, a tag that is recorded within the user tagging data 320 can be utilized to search for additional content with the same or similar tags. For example, if a particular tag is being tagged with some frequency or popularity within the user tagging data 320, then this particular tag is searched in additional content. When a match is made between the additional content and the particular tag, then this different content is tagged with the particular tag. The additional content can be already tagged by the content provider or closed captioned or subtitle data can be utilized.

Figure 12B:
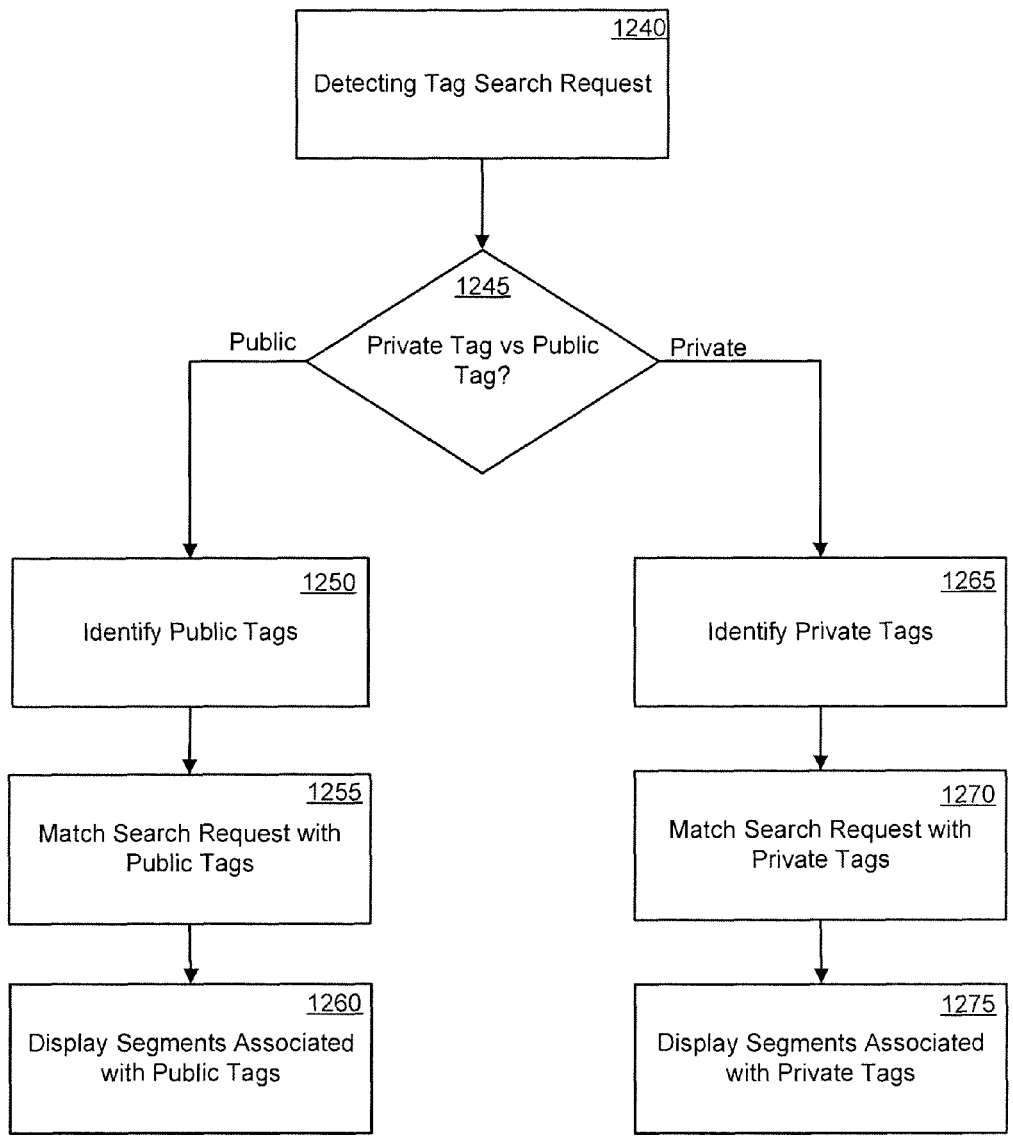

FIG. 12B illustrates a process of searching for tagged content through a client device 150 or input device 170 while leveraging the platform server 120. In Block 1240, a tag search request is detected. In one embodiment, a search term for a tag is detected.

In Block 1245, the tag search request is directed towards either a public tag search or a private tag search. In a public tag search, the content being matched with the search for the public tag search include content that was not viewed by the account holder. For example, the public tags being searched could be tagged by anyone whether or not the account holder viewed and/or tagged the content. In a private tag search, the content being matched with the search for the private tag includes content that was tagged by the account holder. In some instances, the content tagged by the account holder was also viewed by the account holder.

If the search is for public tags, then the public tags are identified in Block 1250. In one embodiment, the public tags are found in the public tagging data 340. In Block 1255, the search request is matched with the identified public tags as found in Block 1250. In Block 1260, the segments within content related to the matched public tags are displayed.

If the search is for private tags, then the private tags are identified in Block 1265. In one embodiment, the private tags are found in the user tagging data 320. In Block 1270, the search request is matched with the identified private tags as found in Block 1265. In Block 1275, the segments within content related to the matched private tags are displayed.

In another embodiment, a search request is detected for a particular term. All content available to the user account is searched for public and private tags associated with the particular term. Once the selected content is identified, the content is ranked and prioritized based on popularity. For example if one content is watched more often or tagged more often than other content, then the more watched and tagged content is considered more popular.

In another embodiment, the search request can include product names or detailed topic such as "Dodge Charger" and "race cars". In this example, content having tags with "Dodge Charger" or "race cars" would be identified. The content may include movies with segments that qualify or may be advertisements from manufacturers.

Figure 13:
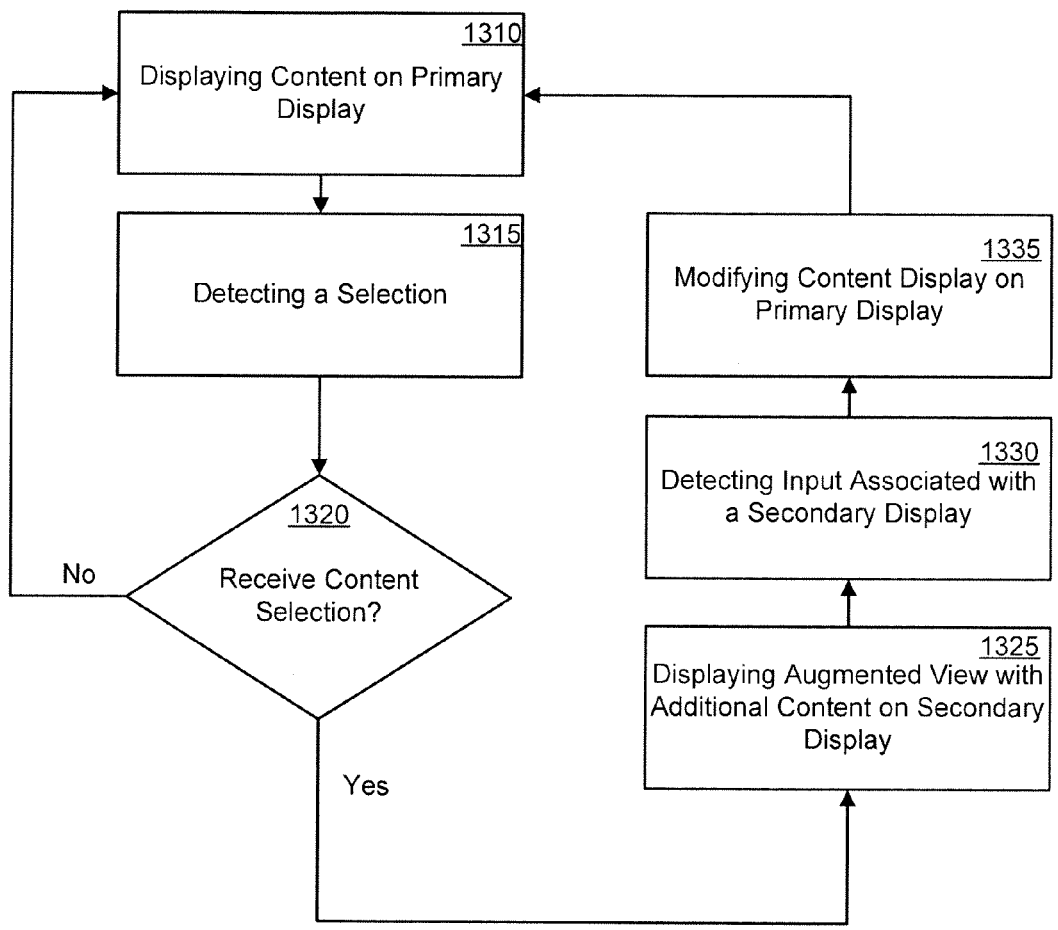

FIG. 13 illustrates content display on a secondary display device through a client device 150 or input device 170 while leveraging the platform server 120. In Block 1310, content is displayed on a primary display. The primary display includes a display device 140 within FIG. 1. In one embodiment, the content displayed within the primary display is a listing of content such as the screen shots 500, 530, 550, and 580 within FIGS. 5A, 5B, 5C, and 5D, respectively. In another embodiment, the content displayed within the primary display is content such as a movie, television show, music display, or gaming application.

In Block 1315, a selection is detected. In one embodiment, the selection is performed through the input device 170. The selection can include highlighting, hovering, or selecting available content shown on the primary display.

If a selection is detected in the Block 1320, then an augmented view is displayed with additional content on the secondary display. In one embodiment, the secondary display is a mobile device such as a smart phone, a tablet computer, and a portable computer. In another embodiment, the secondary display is a visual display on the input device 170. The augmented view can include further additional details of the selected content such as descriptions, actors, directors, ratings, reviews, tags, and timelines of content. Examples of the augmented view are shown as screen shots 700 and 730 within FIGS. 7A and 7B, respectively.

In Block 1330, input associated with the content on the secondary display is detected. In one embodiment, the input includes selecting items shown on the secondary display. In Block 1335, the content displayed on the primary display is modified based on the input from the Block 1330. For example while a movie is being played on the primary display in Blocks 1310 and 1315, additional information about the movie such as a related movie is displayed on the secondary display in Block 1325. If the related movie is selected based on the display through the secondary display in Block 133, then the related movie will be displayed on the primary display in Block 1335.

In one embodiment, content such as a movie or television show is being displayed on the primary display. Based on the subject matter of the content, targeted advertising is displayed on the secondary display, and the secondary display is capable of interacting independently with the targeted advertising from the primary display. For example, a user of the secondary display can purchase the product/service being offered through the secondary display while the content continues to play on the primary display. In one embodiment, the subject matter of a segment of the content being displayed on the primary displayed can be detected through the use of tags associated with that particular segment.

In another embodiment, a game such as a card game can be played while using the primary and secondary displays. For example, the score and any publicly available information (e.g., discarded cards) is displayed on the primary display which is shared among all the players. Each of the players also has a secondary display such as a smart phone where private information such as their card hand is only viewable by that particular player. As the particular player modifies their respective secondary display by discarding a card, the primary display is modified and shows the discarded card.

Figure 14:
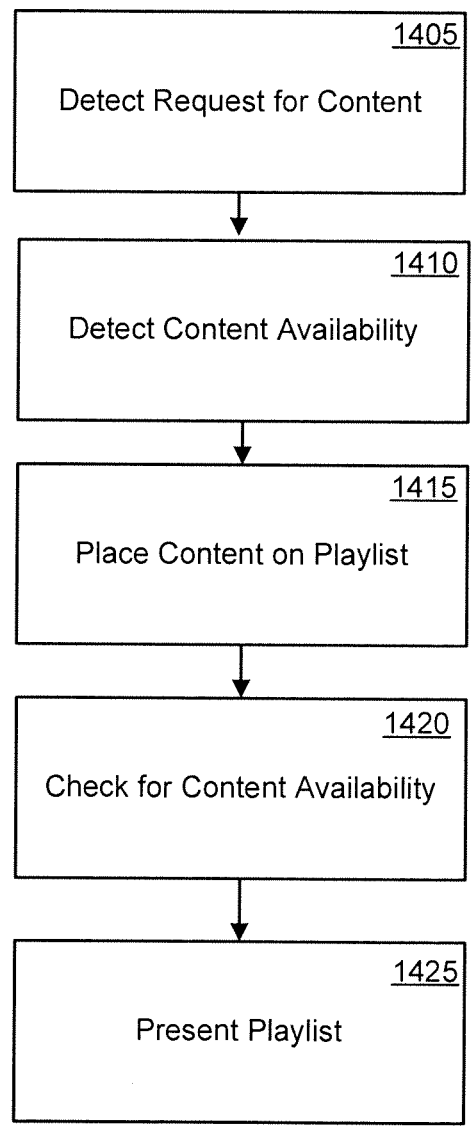

FIG. 14 illustrates adding content to a playlist through a client device 150 or input device 170 while leveraging the platform server 120. In Block 1405, content is detected by the platform server 120. In one embodiment, the platform server 120 is configured to receive input that corresponds to content. For example, an image captured by a camera associated with the input device 170 represents content and is transmitted to the platform server 120 via an email message. In this example, the captured image may include a movie poster, an actor, and a director which represents the content. The captured image may also be a bar code which represents the content. In another embodiment, a title of the content can also be sent to the platform server 120 via an email message. In yet another embodiment, the actors or director associated with the content can also be sent to the platform server 120 via an email message.

In another embodiment, content browsed through a website can also be sent to the platform server 120. For example, the web page can include an interface through an API (application protocol interface) which allows the user who is viewing the web page to select an icon thus capturing this content to be received by the platform server 120. By selecting the icon, the content displayed on the web page is sent to the platform server 120.

In Block 1410, availability of the content detected in Block 1405 is determined. In one embodiment, there are different states of availability for the content. Exemplary states of availability include free content, free content through a subscription, content available for purchase, content available soon, and content not available.

In Block 1415, the content is placed within a playlist. In one embodiment, the playlist includes one or more selected content. In one embodiment, the playlist is associated with a particular user account and is stored within the user viewing data 314.

In Block 1420, the availability of the content within the playlist is checked. In one embodiment, the availability is dependent on the subscriptions of the particular user account. In one embodiment, the availability is determined through the user subscription data 315 within the platform database 125.

In Block 1425, the playlist is presented. In one embodiment, the playlist is presented through the client device 150. In one embodiment, the content within the playlist and the corresponding availability of each content will also be displayed. An exemplary display is shown in screenshots in FIGS. 5C, 5D, and 6.

In use, a user associated with a user account can identify content of interest and have this content sent to a playlist for later viewing on their client device 170. The user can identify the content of interest by browsing the Internet, capturing images related to content, and emailing titles of content. Further, the playlist can be optimized through the recommendation module 235 where the user subscription data 315 is utilized to provide optimal content providers for providing the content listed within the playlist.

Figure 15:
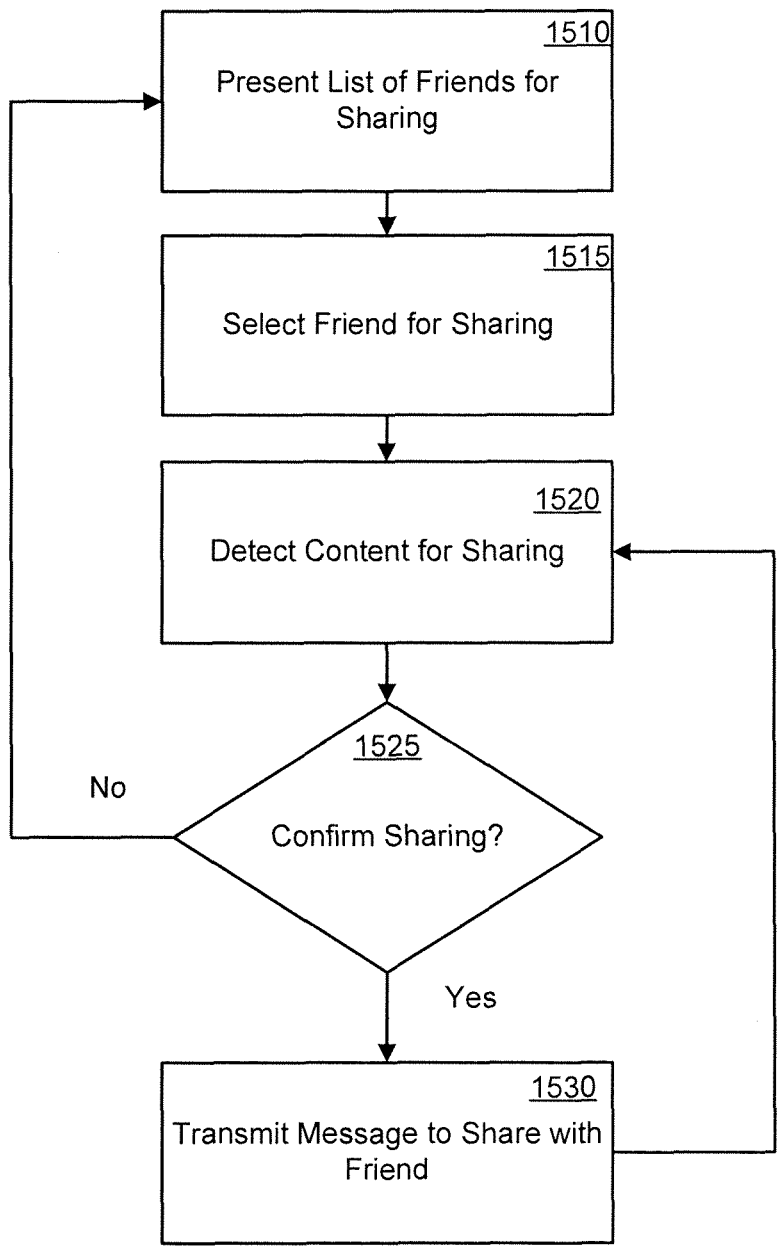

FIG. 15 illustrates sharing content among friends through a client device 150 or input device 170 while leveraging the platform server 120. In Block 1510, a list of friends is displayed. In one embodiment, the list of friends is stored within the user connection data 325 within the platform database 125. In one embodiment, the user connection data 325 includes contacts or friends associated with the particular user account.

In Block 1515, a selection from the list of friends is made for sharing content. In Block 1520, content is detected for sharing with the selection in the Block 1515. In one embodiment, the content is detected through searching and browsing through the client device 170. In another embodiment, the content can be found within the playlist as described within FIG. 14, the content shown within FIGS. 5A, 5B, 5C, 5D, and 6.

In Block 1525, a check is performed to confirm that sharing with the selected friends from the Block 1515. If confirmation is received, then a message is transmitted to the selected friend within Block 1530. In one embodiment, the message allows the selected friend to access the detected and shared content from the Block 1520. In one embodiment, the shared content is checked for availability for the recipient (selected friend). For example, the subscriptions associated with the recipient are utilized to determine availability of the content. In one embodiment, the subscription information for the recipient is stored within the user subscription data 315.

In one instance, the shared content is available for free to the recipient because the recipient is already subscribed to a content provider that can provide the shared content. In another instance, the shared content is available to the recipient for a fee. In yet another embodiment, the originator or user account that is sharing the shared content with the recipient is notified if the recipient cannot access the shared content without paying a fee. In this instance, the originator or user account that is sharing the shared content is able to purchase the shared content for the recipient. This way, the recipient can have access to the shared content without incurring additional fees or undertaking any other actions to purchase or rent the shared content. In one embodiment, the originator can earn referral credits if the recipient should subscribe to the content provider.

Figure 16:
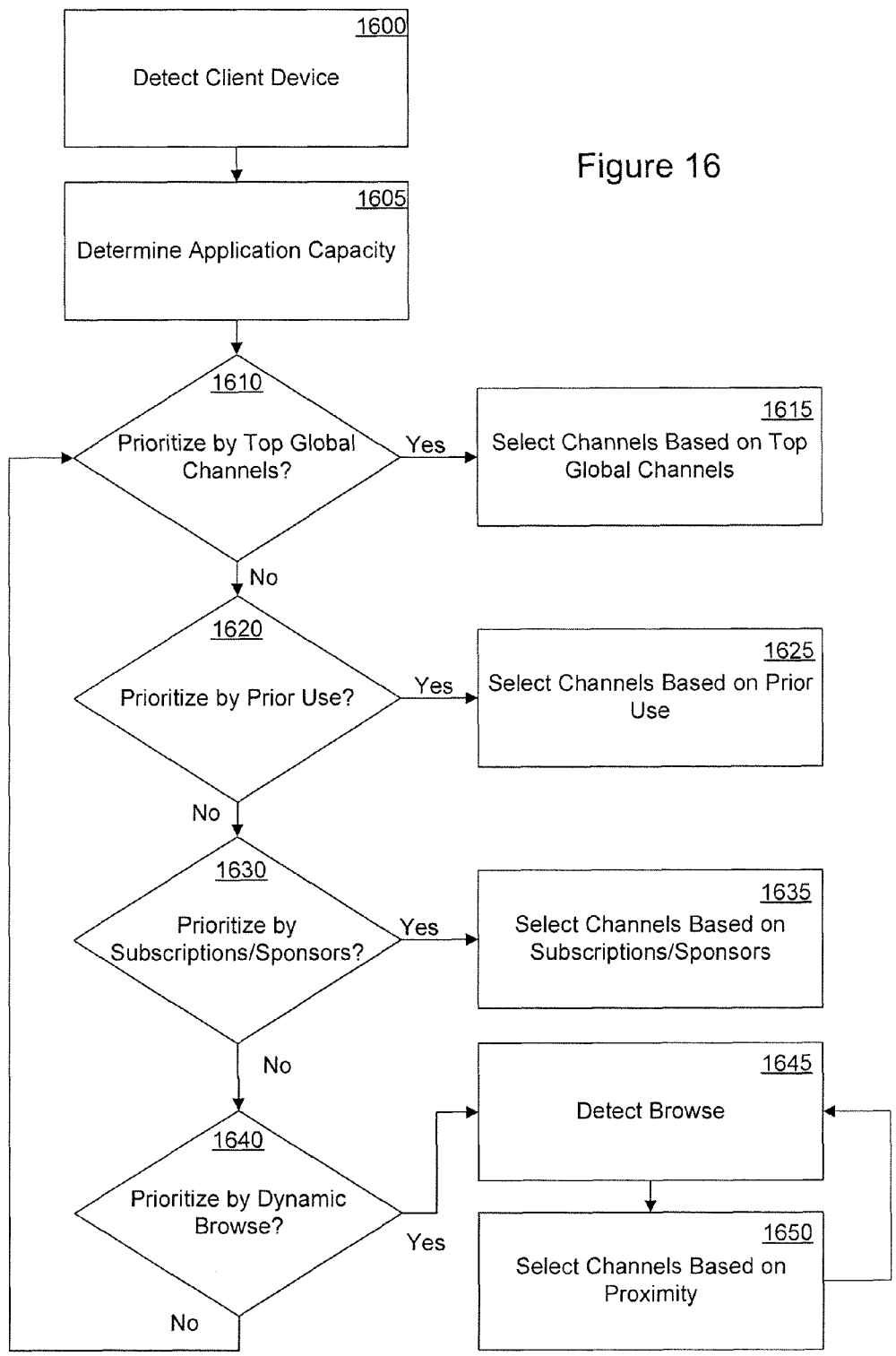

FIG. 16 illustrates dynamically preloading channels on the client device 150 in anticipation of launching content associated with the preloaded channels. In one embodiment, preloading channels is coordinated through the platform server 120.

In Block 1600, the client device 150 is detected. In one embodiment, the capabilities of the client device 150 are discovered through the platform server 120. For example, the authentication module 205 within the platform module 130 in conjunction with the user device data 330 within the platform database 125 are capable of discovering the capabilities of the client device 150 by identifying the model number and base memory configuration of the client device 150. In another embodiment, the processing capability and the memory capacity of the client device 150 can by dynamically tested through the platform server 120.

In Block 1605, the application capacity is determined. In one embodiment, the maximum number of applications that can effectively run on the client device 150 is determined. In one embodiment, the applications are channels that are running on the client device 150. A channel is a specialized application that allows content corresponding to the channel to be streamed through the client device 150. Up to the maximum number of applications or channels are capable of running on the client device 150 without substantial degradation in performance.

If the channels are selected based on global popularity in Block 1610, then the top channels based on global popularity are selected in Block 1615. In one embodiment, global popularity is determined through the public viewing data 335. For example, the most watched channels in terms of number of viewers or duration of viewing can be gathered from the public viewing data 335. These top channels are selected and up to the maximum number of channels as determined within the Block 1605 are preloaded onto the client device 150 and run in the background prior to being utilized.

If the channels are selected based on prior use in Block 1620, then the top channels based on prior use by the client device 150 are selected in Block 1625. In one embodiment, the prior use is determined through the user viewing data 310. For example, the most watched channels in terms of number of views or duration of viewing can be gathered from the user viewing data 310. These top channels are selected and up to the maximum number of channels as determined within the Block 1605 are preloaded onto the client device 150 and run in the background prior to being utilized.

If the channels are selected based on subscriptions in Block 1630, then the top channels based on subscription by the client device 150 are selected in Block 1625. In one embodiment, the subscription is determined through the user subscription data 315. For example, the subscription to channels associated with the user account is stored within the user subscription data 315. The subscribed channels are selected and up to the maximum number of channels as determined within the Block 1605 are preloaded onto the client device 150 and run in the background prior to being utilized. In another embodiment, a sponsored channel can also be included even though the user account associated with the client device 150 is not subscribed to this channel. In one embodiment, the sponsored channel is a paid placement.

If the channels are selected based on dynamic browsing information in Block 1640, then the top channels based on the proximity of browsing by the client device 150 are selected in Blocks 1645 and 1650. In Block 1645, the current location of browsing through the client device 150 is detected. For example, the highlighted content 520 within FIG. 5A illustrates content being highlighted in response to browsing from the client device 150.

In one embodiment, the channels associated with content near the highlighted content are ranked and prioritized based on their location to the highlighted content in Block 1650. Based on the ranked and prioritized channels and maximum number of channels as determined within the Block 1605, channels are preloaded onto the client device 150 and run in the background prior to being utilized. The channels can be re-ranked and re-prioritized based on a different location of browsing being detected within the Block 1645.

In use, the preloaded channels run in the background on the client device 150 prior to content being streamed through one of the preloaded channels. In one embodiment, preloading the channels on the client device 150 reduces the lag associated with streaming content through one of the preloaded channels.

An embodiment of the present invention relates to a computer storage product with a computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. A method for presenting content to a client device through a platform server comprising:
    detecting a first selection of current content at the platform server wherein the first selection of the current content is centrally displayed;
    identifying a first attribute of the first selection of the current content, wherein the first attribute characterizes the first selection;
    identifying a first additional content based on the first attribute wherein the first additional content is aggregated from multiple content providers;
    displaying the first additional content concentrically around the first selection of the current content at the client device;
    detecting a second selection from the first additional content at the platform server;
    detecting a match between the first attribute and a second attribute associated with the second selection, wherein the second attribute characterizes the second selection;
    centrally displaying the second selection in place of the first selection;
    identifying a second additional content based on the first attribute when the match occurs wherein the second additional content and the first additional content are different;
    selectively displaying the second additional content concentrically around the second selection when the match occurs;
    identifying a third additional content based on the second attribute when the match does not occur, wherein the third additional content and the first additional content are different, such that the second attribute substitutes for the first attribute as the criteria for identifying the third additional content;
    selectively displaying the third additional content concentrically around the second selection when the match does not occur;
    detecting an activation of the second selection; and
    transmitting content associated with the second selection configured to be displayed at the client device.

2. The method according to claim 1; further comprising transmitting a representation of the first additional content from the platform server.

3. The method according to claim 1, wherein the first additional content is graphically shown based on genres, actors, directors, and series.

4. The method according to claim 1, wherein the first attribute is based on an attribute type selected from a genre, an actor, a director, and a series.

5. The method according to claim 1, further comprising storing the first selection of the current content on the platform server.

6. The method according to claim 1, further comprising shifting a display screen based on the selection of first additional content whereby the selection of second additional content remains within a central portion of the display screen.

7. The method according to claim 1, wherein the detecting the first selection further comprises detecting a position of a highlighted cursor.

8. The method according to claim 1, wherein the detecting the first selection further comprises detecting a selection of content highlighted by a cursor.

9. The method according to claim 1, wherein the second attribute has a second attribute type that is different from a first attribute type associated with the first attribute.

* * * * *